United States Patent
McCordic et al.

(10) Patent No.: US 12,300,892 B2
(45) Date of Patent: May 13, 2025

(54) INTEGRATED STRUCTURE, TWO RADAR MODULAR ASSEMBLY (RMA) STACKABLE RADAR

(71) Applicant: Raytheon Company, Waltham, MA (US)

(72) Inventors: Craig H. McCordic, Medfield, MA (US); Michael P. Martinez, Worcester, MA (US); Craig Richardson, Watertown, MA (US); Mark J. Beaulieu, Sutton, MA (US)

(73) Assignee: Raytheon Company, Arlington, VA (US)

( * ) Notice: Subject to any disclaimer, the term of this patent is extended or adjusted under 35 U.S.C. 154(b) by 486 days.

(21) Appl. No.: 17/660,386

(22) Filed: Apr. 22, 2022

(65) Prior Publication Data

US 2023/0344143 A1    Oct. 26, 2023

(51) Int. Cl.
| | | |
|---|---|---|
| H01Q 1/12 | (2006.01) | |
| G01S 7/02 | (2006.01) | |
| H01Q 21/00 | (2006.01) | |
| G01S 13/02 | (2006.01) | |

(52) U.S. Cl.
CPC ......... *H01Q 21/0025* (2013.01); *G01S 7/027* (2021.05); *H01Q 1/12* (2013.01); *G01S 2013/0245* (2013.01)

(58) Field of Classification Search
CPC ...... H01Q 21/0025; H01Q 1/12; G01S 7/027; G01S 2013/0245
See application file for complete search history.

(56) References Cited

U.S. PATENT DOCUMENTS

| | | |
|---|---|---|
| 6,222,502 B1 | 4/2001 | Falbo et al. |
| 6,236,862 B1 | 5/2001 | Erten et al. |
| 6,292,134 B1 | 9/2001 | Bondyopadhyay |

(Continued)

FOREIGN PATENT DOCUMENTS

| | | |
|---|---|---|
| CA | 2 873 172 39 | 9/2015 |
| CA | 2 954 985 110 | 4/2016 |

(Continued)

OTHER PUBLICATIONS

Foreign Patent.*

(Continued)

*Primary Examiner* — Vladimir Magloire
*Assistant Examiner* — Bongani Jabulani Mashele

(57) ABSTRACT

A radar array assembly is provided, comprising a first chassis and a first vertical stiffener. The first chassis is configured to house a first set of array electronics and a second set of array electronics. The first vertical stiffener is disposed within and operably coupled to the first chassis to enable the first chassis to be resistant to buckling and to define a first cavity in which the first set of array electronics is disposed and a second cavity in which the second set of array electronics is disposed, wherein the first vertical stiffener is configured to be embedded within the first set of array electronics and the second set of array electronics, wherein the first vertical stiffener comprises a first integrated cooling manifold configured to cool both the first set of array electronics and the second set of array electronics.

20 Claims, 15 Drawing Sheets

(56) References Cited

U.S. PATENT DOCUMENTS

| | | | |
|---|---|---|---|
| 6,292,364 B1* | 9/2001 | Fitzgerald | H05K 7/20345 257/714 |
| 7,603,894 B2 | 10/2009 | Breed | |
| 8,169,311 B1 | 5/2012 | Breed | |
| 8,178,457 B2 | 5/2012 | de Rochemont | |
| 8,803,759 B1* | 8/2014 | Angelucci | H01Q 21/0025 343/702 |
| 8,810,448 B1* | 8/2014 | Ellsworth | G01S 7/02 361/699 |
| 8,836,607 B2 | 9/2014 | Cook | |
| 9,116,222 B1 | 8/2015 | Ellsworth et al. | |
| 9,620,866 B2 | 4/2017 | Chang et al. | |
| 9,698,465 B1 | 7/2017 | Kullman et al. | |
| 10,651,567 B2 | 5/2020 | Kamo et al. | |
| 10,684,365 B2 | 6/2020 | Bunch et al. | |
| 10,886,595 B1 | 1/2021 | Ortel et al. | |
| 2007/0057781 A1 | 3/2007 | Breed | |
| 2008/0316101 A1 | 12/2008 | Brown et al. | |
| 2010/0039770 A1 | 2/2010 | Danello et al. | |
| 2010/0157531 A1* | 6/2010 | Mason | H01Q 3/26 361/697 |
| 2014/0368373 A1 | 12/2014 | Crain et al. | |
| 2020/0029469 A1* | 1/2020 | McCordic | H05K 7/20645 361/699 |
| 2021/0083399 A1* | 3/2021 | Mccordic | H01Q 1/02 343/873 |

FOREIGN PATENT DOCUMENTS

| | | | | |
|---|---|---|---|---|
| CN | 109075454 A | | 12/2018 | |
| CN | 105960132 B | * | 7/2019 | H05K 5/069 |
| CN | 111781558 A | * | 10/2020 | G01S 7/02 |
| DE | 112018002020 T5 | | 1/2020 | |
| EA | 200000091 A1 | | 6/2000 | |
| EP | 2974085 A2 | | 1/2016 | |
| EP | 3082920 A1 | | 10/2016 | |
| EP | 3602144 A1 | | 2/2020 | |
| JP | 2000-027302 A | | 1/2000 | |
| TW | I 666823 B | | 7/2019 | |
| WO | WO 2011/117619 A2 | | 9/2011 | |
| WO | WO 2012/154262 A2 | | 11/2012 | |
| WO | WO 2014/168499 A1 | | 10/2014 | |
| WO | WO 2014/171993 A2 | | 10/2014 | |
| WO | WO 2016/179650 A1 | | 11/2016 | |
| WO | WO 2017/096420 A1 | | 6/2017 | |
| WO | WO 2017/111768 A1 | | 6/2017 | |
| WO | WO 2017/111865 A1 | | 6/2017 | |
| WO | WO 2017/132539 A1 | | 8/2017 | |
| WO | WO 2020/009834 A1 | | 1/2020 | |
| WO | WO 2021/055175 A1 | | 3/2021 | |

OTHER PUBLICATIONS

PCT International Search Report and Written Opinion dated May 30, 2023 for International Application No. PCT/US2023/062342; 10 Pages.

Taiwan Office Action (with English Translation) dated May 31, 2023 for Taiwan Application No. 111117484; 15 Pages.

Bertilsson et al., "A Scalable Architecture for Massive MIMO Base Stations Using Distributed Processing;" Proceedings of the 2016 50$^{th}$ Asilomar Conference on Signals, Systems and Computers; Nov. 6, 2016; 5 Pages.

Hoogeboom et al., "TCAR, the Transatlantic Cooperative AGS Radar: A Programmatic and Technical Overview;" Proceedings of the First European Radar Conference; Feb. 2004; 4 Pages.

PCT International Search Report and Written Opinion dated Jul. 28, 2022 for International Application No. PCT/US2022/027224; 15 Pages.

U.S. Appl. No. 17/357,134, filed Jun. 24, 2022, Harkins et al.

Dickenson, "Air & Missile Defense Radar (AMDR) AN-SPY-6(V);" Raytheon Company PowerPoint Presentation, Distribution A: Public Release; May 21, 2015; 22 Pages.

Ferris et al., "On the Design of a NASA-MSC Antenna Facility;" Paper from the College of Engineering at the University of Michigan; Aug. 1963; 159 Pages.

Lockheed Martin, "Advanced Persistent Surveillance;" Retrieved from https://www.lockheedmartin.com/en-us/products/aegis-combat-system.html; Jun. 2020; 1 Page.

Taiwan Allowance Decision (with English Translation) dated Nov. 28, 2023 for Taiwan Application No. 111117484; 3 Pages.

Response (with English Translation) to Taiwan Office Action dated May 31, 2023 for Taiwan Application No. 111117484; Response filed Jun. 29, 2023; 25 Pages.

* cited by examiner

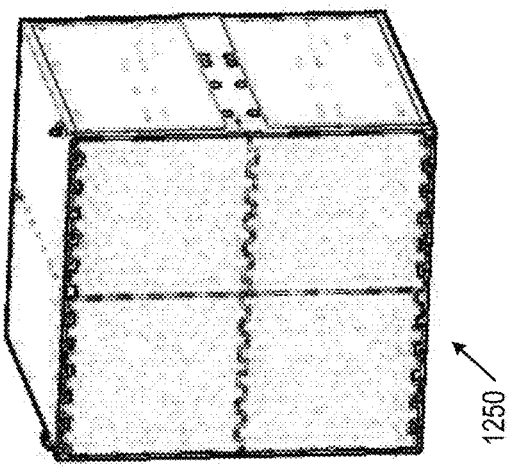
FIG. 12C
How to Double the Radar
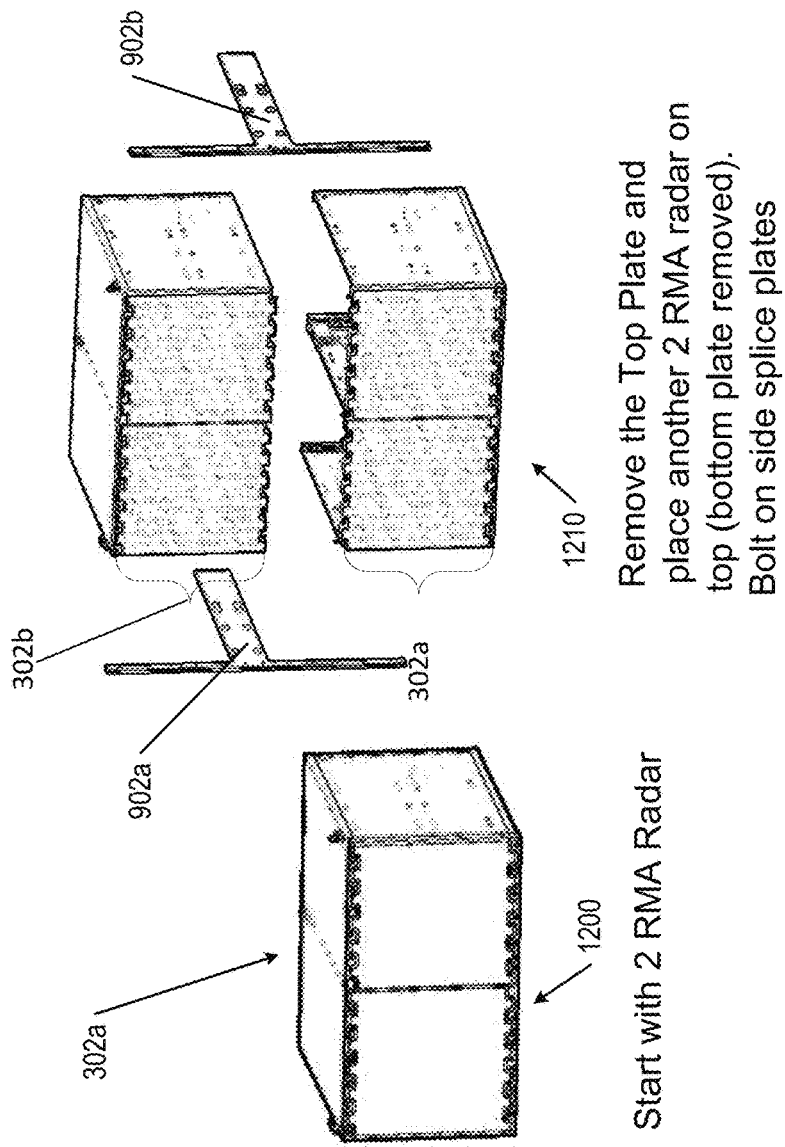
FIG. 12A
FIG. 12B

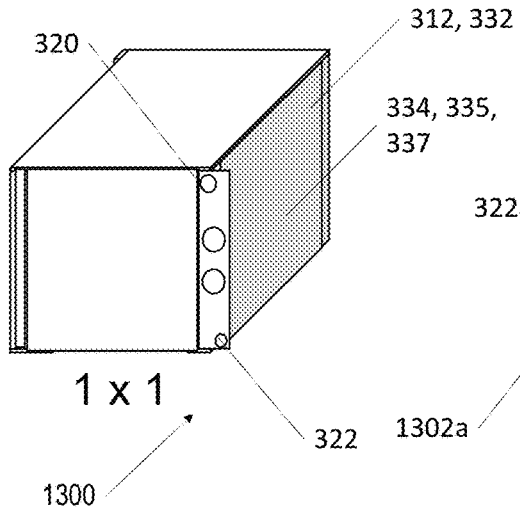
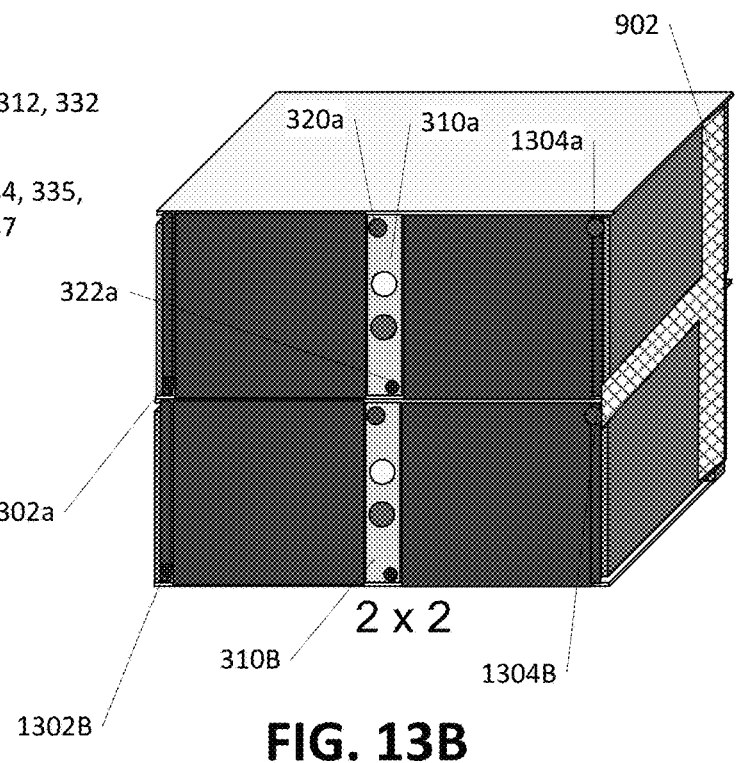
FIG. 13A
FIG. 13B
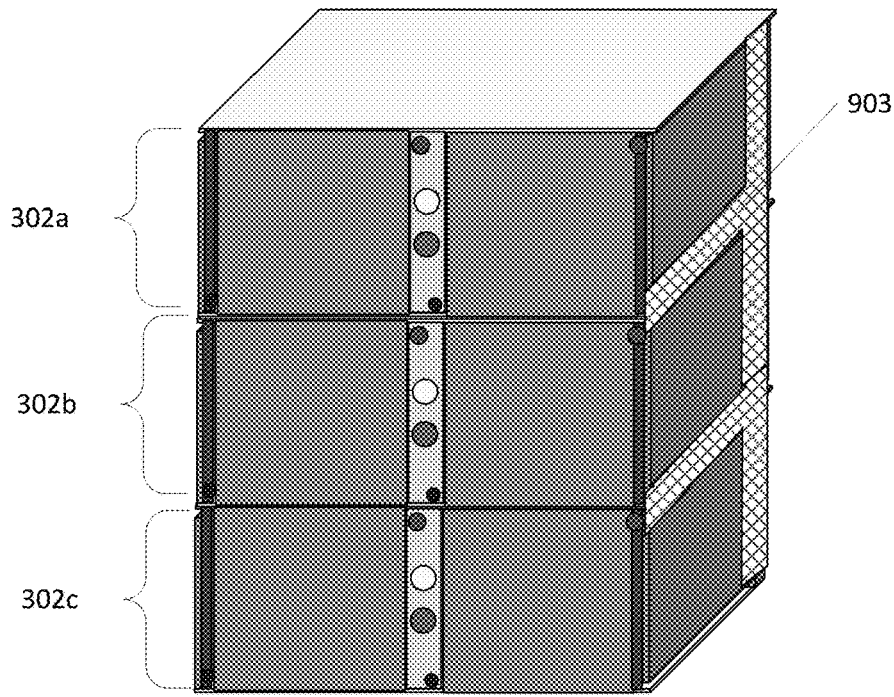
FIG. 13C

INTEGRATED STRUCTURE, TWO RADAR MODULAR ASSEMBLY (RMA) STACKABLE RADAR

FIELD

Embodiments of the disclosure generally relate to devices, systems, and methods for operating a device such as a radar system. More particularly, the disclosure describes embodiments relating to devices, systems, and methods for creating a phased array radar system that is modular, scalable, and stackable

BACKGROUND

Antenna arrays for radar systems can include AESA (active electronically scanned array) antennas, as is known in the art. Typically, the basic building block of an AESA is the Transmit/Receive (T/R) module, which can be packaged to form an AESA antenna element, and may include a radiator, receiver Low Noise Amplifier (LNA), transmit Power Amplifier (PA), and various digitally controlled phase or delay and gain components. Several of these T/R modules are placed on antenna panels in a grid format for transmitting and receiving radar signals. Digital control of the transmit/receive gain and phase allows an AESA antenna to steer or point the resultant antenna beam without physically moving the antenna panel. Modern day low cost AESA antenna panels employ printed circuit radiators connected to surface mount Monolithic Microwave Integrated Circuit (MMIC) devices that contain the LNA, PA and phase/gain control circuitry, all on a single printed circuit board (PCB).

In recent years, AESA antenna array architectures have been developed using modular and/or stackable components. FIG. 1 is an illustration of a prior art antenna array 100 architecture constructed using modular, stackable components, as described in several commonly assigned patents and patent applications, including U.S. Pat. No. 8,810,448, entitled "Modular Architecture for Scalable Phased Array Radars," which issued on Aug. 19, 2014 (hereinafter "the '448 patent"); U.S. Pat. No. 9,116,222, entitled, "Modular Architecture for Scalable Phased Array Radars," (which is a divisional of U.S. Pat. No. 8,810,448), which issued on Aug. 25, 2015; and U.S. Patent Publication No. 20210083399, entitled "Modular and Stackable Antenna Array," having application Ser. No. 16/573,954, filed on Sep. 17, 2019 and published on Mar. 18, 2021 (hereinafter "the '954 Application"). The disclosures of each of these documents are hereby incorporated by reference.

As shown in FIG. 1 and as further described in the above-listed patent documents, a plurality of power and beamforming building blocks 102 can be arranged in an array 116 in rows and columns. Each Modular Building Block (MBB) 102 (also referred to herein as a Radar Modular Assembly (RMA) and/or a functional building block (FBB)) may include a number of transmit/receive integrated multichannel module (TRIMM) cards 110 and their associated power and signals electronics cards including, for example a plurality of TRIMMs, a synthesizer card, a DREX (Digital Receiver Exciter) card 106, a synthesizer 108, and an auxiliary power controller card 104. In some embodiments, the RMA 102 can be based on a radar module 10, similar to the radar module of FIG. 1A of the '448 patent, which is shown in FIG. 2.

As explained in the '448 patent, the radar module 10 includes a chassis 11 that includes a top cold plate 12, a supply manifold 14a with an input port 42, a return manifold 14b with an output port 22, a bottom cold plate 16 and a front plate 18. The chassis 11 is configured to hold LRUs (e.g., circuit cards) such as transmit/receive integrated microwave modules (TRIMMs) 32 that include transmit/receive (T/R) modules (33), dual digital receiver exciter (DDREX) modules 34, a synthesizer module 36, and an auxiliary/controller module 40. The chassis 11 performs a cooling function. For example, the T/R modules 33 produce high amounts of heat which must be dissipated or else the active circuits (e.g., power amplifiers) will cease to operate properly. The supply manifold 14a includes channels that receive coolant at the input port 42. The coolant is circulated throughout the chassis 11 and removed via the return manifold 14b out the output port 22. In particular, the chassis 11 performs as a heat sink drawing the heat away from the active circuits (e.g., in the T/R modules 33). The chassis 11 includes set screws 46 attached to the supply manifold 14a and to the return manifold 14b.

In this example architecture of the RMA 102, each individual TRIMM card 110 may be replaceable as well as the architecture may be modular at the modular building block. A plurality of MBB/RMAs 102 can be combined to form a Modular Radar Assembly (MRA), and multiple MRAs can be combined together to form a single radar antenna array 114. As described further in the aforementioned '954 application, in the example of FIG. 1, groups of the RMA 102 can be coupled together, with its own supporting structure 122, to form a building block section 112 of a modular radar assembly (MRA) 114, wherein each section 112 is configured to have its own respective connections for power, cooling, control signals, and beamforming that are coupled in parallel, such that each section 112 can function independently of each other section. In the antenna array 100 of FIG. 1, this enables the sections 112 to be combined (e.g., by stacking or by being placed adjacent to each other) together to produce any size antenna array desired, including forming an array face 120 by aligning the faces of each respective MRA sub section 112, to create a single uniform array face 120.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

Implementations such as that described in the '954 application, e.g., as shown in FIG. 1, can provide a useful, scalable, stackable option for creating radar systems that can produce any size antenna array, maintaining the ability to easily increase size, sensitivity, and capability of the antenna array. However, because of the large size and heavy weight of the supporting structure 122 (FIG. 1) that is provided behind the array 114 itself (indeed, provided behind each section 112), the implementation may be less suitable for smaller radar systems that may require only a few RMAs 102 (e.g., two to eight RMAs 102 for example). Multiple applications are being developed that require smaller radars, such as those having a size in two to six MBB range. One issue with these applications is that each size and configuration can require a new structure design, because the smaller radars are not using the support structure 122, due to its size and weight. Thus, for smaller radars built using the standard MBB 102, a new support structure may be required to be designed for every small radar configuration.

Another issue with arrangement of FIG. 1, such as with some embodiments of the modular radar assembly (MRA) 114, is that it can be difficult to maintain the lattice structure along the edges of each MRA 114. As a result, in some implementations, there can be a gap between the edges of the MRAs. As is understood in the art, maintaining consistent lattice spacing is important in antenna operation. For example, antennas operating at higher frequencies require tighter lattice spacing between the active elements, which leaves less room for the active circuitry or other functions. Lattice spacing becomes even tighter when $\lambda/2$ (half wavelength at transmitted frequency) spacing is required for a wide scan angle. Gaps in the lattice can result in issues such as undesired changes to the antenna pattern and grounding issues. When multiple antenna elements work together to create an antenna pattern (e.g., the antenna elements are all excited together), having a common ground potential between elements also can be very important. If grounds are separated, or the lattice spacing becomes inconsistent and/or too large, the resultant antenna patterns (made by multiple antenna elements at once) can become degraded, with possible problems including signal losses, resonance effects, "suck-outs" (nulls), etc., as will be appreciated by those of skill in the art.

Use of structures such as the radar module 10 (FIG. 1) as part of an RMA 102 and/or MRA 114, can present challenges with maintaining the aforementioned lattice spacing, because this design (e.g., as shown in FIG. 1A of the '448 patent and as explained above in the description of FIG. 1) includes its cooling manifolds (e.g., supply manifold 14a and return manifold 14b), including input port 42 and output port 22, along the outer walls of the chassis 11. The space and thickness this manifold arrangement takes up—on both sides of the chassis 11—can increase the size of a gap between MRAs (especially if MRAs 102 are adjacent and each has this same structure, such that the cooling manifold from one MRA disposed against the cooling manifold from another MRA. The space taken up by these manifolds, on the outside of the chassis, can make it difficult to maintain lattices and lattice spacing at the edges of the antenna array.

Certain embodiments herein help to address at least this issue by expanding further on the RMA design described in the '448 patent and the '354 application, for example, by creating a structure of two RMAs with a single, shared cooling manifold arrangement disposed between them, so that the outer walls of the two-RMA arrangement do not have to both have a manifold contained therein and can thus be thinner. Therefore, an overall arrangement of two RMAs, with the embodiments herein, will allow closer lattice spacing on the antenna face, as compared to taking two RMAs 102 of FIG. 1 that use the chassis 11 as shown in FIG. 1. In addition, the central shared manifold between the two RMAs also is configured to be operable as an internal supporting structure for the RMA within the building block itself, within the array lattice (between the TRIMMs). For example, in certain embodiments, a structure is added to modify the chassis 11 by providing additional internal support via a stiffener structure that is also configured to house cooling manifolds. The extra support and strength that the stiffener structure adds, enables the two-RMA structure to be stackable, without requiring the bulky, heavy support structure 122 of FIG. 1. In certain embodiments, the stackability may enable the creation of smaller-sized radars, such as up to three double-RMA units high, by any desired width.

In addition, certain embodiments herein expand and improve on the above-described systems because a radar can be formed, using the double RMA structure described in certain embodiments herein, without requiring significant extra structure behind the array. For example, certain embodiments provide an RMA structure that has a built-in self-support via a vertical manifold and array plate. Thus, the double RMA structures herein are self-supported (i.e., have built in self-support, especially via the vertical stiffener and array plate, discussed further below) and stackable, enabling many possible configurations with little to no non-recurring engineering (NRE) expense. Limited and custom structures may be provided to enable the radar that is formed to have the correct height (e.g., by putting on a tower, pedestal, or other separate structure), motion (e.g., by putting on a rotating structure), and/or mobility) (e.g., by putting on a ship, moving vehicle, truck, aircraft, etc.).

In one aspect, a radar array assembly is provided, comprising a first chassis and a first vertical stiffener. The first chassis is configured to house a first set of array electronics and a second set of array electronics. The first vertical stiffener is disposed within and operably coupled to the first chassis to enable the first chassis to be resistant to buckling and to define a first cavity in which the first set of array electronics is disposed and a second cavity in which the second set of array electronics is disposed, wherein the first vertical stiffener is configured to be embedded within the first set of array electronics and the second set of array electronics, wherein the first vertical stiffener comprises a first integrated cooling manifold configured to cool both the first set of array electronics and the second set of array electronics.

In some embodiments, the first chassis comprises a first channel configured to allow coolant flow therethrough and wherein the first vertical stiffener comprises a second channel configured to allow coolant flow therethrough, wherein the first and second channels are in operable communication. In some embodiments, the radar array assembly further comprises a first array plate having a first side and a second side opposite the first side, the first array plate coupled to the first vertical stiffener, wherein the first array plate comprises a third channel configured to allow coolant flow therethrough, wherein the third channel is in operable communication with at least one of the first and second channels.

In some embodiments, the radar array assembly further comprises a first array plate having a first side and a second side opposite the first side, the first array plate coupled to the first vertical stiffener, wherein the first array plate is configured to support first and second radiator assemblies that are in operable communication with, respectively, the first set of array electronics and the second set of array electronics, wherein the first array plate is configured to enable the first radiator assembly and the second radiator assembly to be interlocked and aligned to create a single monolithic array face. In some embodiments, the first vertical stiffener and first array plate, in combination with the first chassis, provide a built-in self-support for the radar array assembly. In some embodiments, the first vertical stiffener and first array plate, in combination with the first chassis, are configured to enable the first chassis to be stacked on top of a second chassis that is identical to the first chassis, to double a size of the single monolithic array face.

In some embodiments, the radar array assembly further comprises a first array plate having a first side and a second side opposite the first side, the first array plate coupled to the first vertical stiffener and having a first portion associated with the first set of array electronics and a second portion associated with the second set of array electronics; a first radiator assembly operably coupled to the first portion of the first array plate and configured for operable communication with the first set of array electronics; and a second radiator assembly operably coupled to the second portion of the first array plate and configured for operable communication with the second set of array electronics; wherein the first array plate is configured to support the first radiator assembly and the second radiator assembly and is configured to enable the first radiator assembly and the second radiator assembly to be interlocked and aligned to create a single monolithic array face.

In some embodiments, the radar array assembly further comprises a first array plate having a first side and a second side opposite the first side, the first array plate coupled to the first vertical stiffener, wherein the first array plate is configured to support first and second radiator assemblies that are in operable communication with, respectively, the first and second sets of array electronics, wherein the first array plate is configured to enable the first radiator assembly and the second radiator assembly to be interlocked and aligned to create a single monolithic array face; a second chassis operably coupled to the first chassis, the second chassis configured to house a third set of array electronics and a fourth set of array electronics, wherein the third set of array electronics and the fourth set of array electronics are coupled to the second chassis via a respective second support structure contained within the second chassis; a second vertical stiffener disposed within and operably coupled to the second chassis so as to enable the second chassis to be resistant to buckling and to define a third cavity in which the third set of array electronics is disposed and a fourth cavity in which the fourth set of array electronics is disposed, wherein the second vertical stiffener is configured to be embedded within the third set of array electronics and the fourth set of array electronics, wherein the second vertical stiffener comprises a second integrated cooling manifold configured to cool both the third set of array electronics and the fourth set of array electronics; and a second array plate having a first side and a second side opposite the first side, the second array plate coupled to the second vertical stiffener, wherein the second array plate is configured to support third and fourth radiator assemblies that are in operable communication with, respectively, the third and fourth sets of array electronics, wherein the second array plate is configured to enable the third and fourth radiator assemblies to be interlocked and aligned with the first radiator assembly and the second radiator assembly as part of the single monolithic array face.

In certain embodiments, the first chassis comprises a first side disposed adjacent the first cavity and a second side disposed adjacent the second cavity and wherein the second chassis is operably coupled to the first chassis along one of the first and second sides. In certain embodiments, the second chassis is stacked on top of the first chassis.

In some embodiments, the first chassis comprises a first side disposed adjacent the first cavity and a second side disposed adjacent the second cavity, the second chassis comprises a third side disposed adjacent the third cavity and a fourth side disposed adjacent the fourth cavity, and wherein the radar array assembly further comprises a splice plate configured to secure at least one of the first and second sides of the first chassis to at least one of the third and fourth sides of the second chassis.

In some embodiments, the radar array assembly further comprises a top plate operably coupled to a top of the first chassis and configured to cover a top surface of the first vertical stiffener and a top side of the first cavity, and a top side of the second cavity; and a bottom plate operably coupled to a bottom of the first chassis and configured to cover a bottom surface of the first vertical stiffener and a bottom side of the first cavity and a bottom side of the second cavity; wherein the top plate, bottom plate, and first chassis cooperate to provide a housing for the first set of array electronics and the second set of array electronics that is watertight and electromagnetic interference (EMI) tight.

In another aspect, a radar module is provided, comprising a first set of array electronics, a second set of array electronics, a chassis, a vertical stiffener, and an array plate. The first set of array electronics is in operable communication with a first set of radiators integrated into a first radiator assembly. The second set of array electronics is in operable communication with a second set of radiators integrated into a second radiator assembly. The chassis is configured to house the first set of array electronics and the second set of array electronics, wherein the first set of array electronics and the second set of array electronics are coupled to the chassis via a respective support structure contained within the chassis. The vertical stiffener is disposed within and operably coupled to the chassis so as to enable the chassis to be resistant to buckling, the vertical stiffener configured to be embedded within the first set of array electronics and the second set of array electronics and configured to define, in the chassis, a first cavity in which the first set of array electronics is disposed and a second cavity in which the second set of array electronics is disposed, wherein the vertical stiffener comprises an integrated cooling manifold configured to cool both the first set of array electronics and the second set of array electronics. The array plate has a first side and a second side opposite the first side, the array plate coupled to the vertical stiffener and configured to support the first radiator assembly and the second radiator assembly, wherein the array plate is configured to enable the first radiator assembly and the second radiator assembly to be interlocked and aligned to create a single monolithic array face for the radar module.

In some embodiments, the chassis comprises a first channel configured to allow coolant flow therethrough, wherein the vertical stiffener comprises a second channel configured to allow coolant flow therethrough, and wherein the first and second channels are in operable communication. In some embodiments, the array plate comprises a third channel configured to allow coolant flow therethrough, wherein the third channel is in operable communication with at least one of the first and second channels. In some embodiments, the first channel is in operable communication with at least one of a coolant input port and a coolant output port that is integrated into the vertical stiffener. In some embodiments, the integrated cooling manifold further comprises a supply manifold in operable communication with a coolant input port and a return manifold in operable communication with a coolant output port.

In some embodiments, each of the first set of array electronics and the second set of array electronics comprises a respective plurality of radar transmit/receive (T/R) modules, each T/R module comprising power and beamforming signals, wherein the power and beamforming signals are connected in parallel to each of the first set of radiators and the second set of radiators.

In another aspect, an antenna array is provided, comprising a plurality of stacked radar modules, each respective radar module comprising a first set of array electronics, a second set of array electrics, a chassis, a vertical stiffener, and an array plate.

The first set of array electronics is in operable communication with a first set of radiators integrated into a first radiator assembly. The second set of array electronics is in operable communication with a second set of radiators integrated into a second radiator assembly. The chassis is configured to house the first set of array electronics and the second set of array electronics, wherein the first set of array electronics and the second set of array electronics are coupled to the chassis via a respective support structure contained within the chassis. The vertical stiffener is disposed within and operably coupled to the chassis to enable the chassis to be resistant to buckling, the vertical stiffener configured to be embedded within the first set of array electronics and the second set of array electronics and configured to define, in the chassis, a first cavity in which the first set of array electronics is disposed and a second cavity in which the second set of array electronics is disposed, wherein the vertical stiffener comprises an integrated cooling manifold configured to cool both the first set of array electronics and the second set of array electronics. The array plate has a first side and a second side opposite the first side, the array plate coupled to the vertical stiffener and configured to support the first radiator assembly and the second radiator assembly, wherein the array plate is configured to enable the first radiator assembly and the second radiator assembly to be interlocked and aligned to create a single, monolithic array face for the respective radar module.

In some embodiments, the chassis, vertical stiffener, and array plate of each respective radar module are configured to enable a respective monolithic array face for each respective radar module, to align with the respective monolithic array faces for every other respective radar module in the plurality, to create a single monolithic array face for the antenna array that has no interruptions in an array lattice for the single, monolithic array face for the antenna array.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 12A is a front view of a first part of an exemplary arrangement to double a radar, in accordance with one embodiment;

FIG. 12B is a front exploded view of a second part of an exemplary arrangement to double a radar, in accordance with one embodiment;

FIG. 12C is a front view of a third part of an exemplary arrangement to double a radar, in accordance with one embodiment;

FIG. 13A is a rear perspective view of an exemplary single RMA radar in 1×1 arrangement, in accordance with one embodiment;

FIG. 13B is a rear perspective view of an exemplary RMA radar in a 2×2 arrangement, in accordance with one embodiment;

FIG. 13C is a rear perspective view of an exemplary RMA radar in a 2×3 arrangement, in accordance with one embodiment.

The drawings are not to scale, emphasis instead being on illustrating the principles and features of the disclosed embodiments. In addition, in the drawings, like reference numbers indicate like elements.

DETAILED DESCRIPTION

Figures 1, 2:
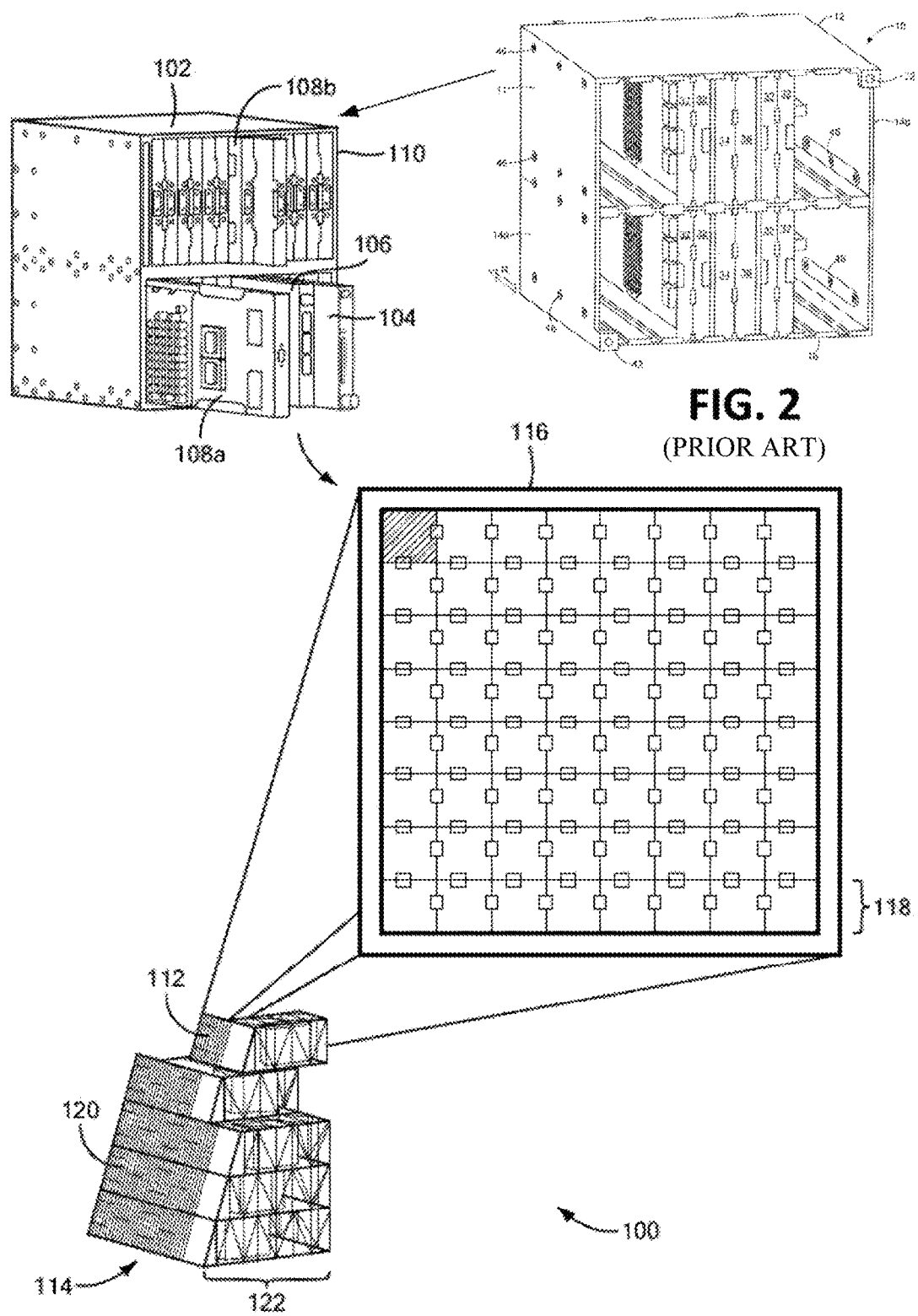
FIG. 1 is an illustration of a prior art antenna array constructed using radar modular assemblies (RMAs), in accordance with one embodiment.
FIG. 2 is an illustration of a prior art radar module, in accordance with one embodiment.

Before describing details of the particular systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

In addition, the following detailed description is provided, in at least some examples, using the specific context of target detection systems (e.g., radar systems) configured to detect, track, monitor, and/or identify targets, where targets can include (but are not limited to) aircraft (both unmanned and manned), unmanned aerial vehicles, unmanned autonomous vehicles, robots, ships, spacecraft, automotive vehicles, and astronomical bodies, or even birds, insects, and rain. At least some embodiments herein are usable with any systems involved with any radar applications, including but not limited to military radars, air traffic control radars, weather monitoring radars, etc.

Users and purchasers of radar systems can prefer to avoid the cost, risk, and extended timelines to develop and deploy new radars. Recent radar developments and advances have focused on scalable phased array technology modularization, to reduce engineering required to tailor radar sensitivity and apertures. Illustrative examples of such modularization are described in the aforementioned several commonly assigned patents and patent applications. Using scalable systems, such as the scalable phased array antennas described in the aforementioned patent documents, can mean that radar users and customers are more willing to adapt these mature, available radar solutions to new mission spaces.

Multiple applications are being developed that require smaller radars, such as those having a size in two to six RMA range. One issue with these applications is that each size and configuration can require a new structure design and/or significant design engineering for each configuration. Certain embodiments herein help to address at least this issue by expanding further on the RMA designs known in the art (e.g., as described in the aforementioned '448 patent and the '354 application) by including the supporting structure for the RMA within the building block within the array lattice (e.g., between the TRIMMs), removing the need for a separate support structure or other structure behind the array. For example, certain embodiments herein are self-supported and stackable, enabling many possible configurations with little to no non-recurring engineering (NRE) expense.

In certain embodiments herein, discussed further below, an integrated structure with 2 stackable RMAs (IS2RMA) is provided as a building block for constructing even more radar configurations. The IS2RMA building block is self-supported so that it can be stacked to create many configurations with little to no NRE. In some embodiments, a radar arrangement is made using a single RMA (Half an IS2RMA); similar combinations can be created if odd numbers of RMAs are required. In certain embodiments, the IS2RMA building block is configured to have an integrated internal structure that can support several more building blocks on top, which provides an arrangement and configuration suitable for smaller 2-6 RMA radars—Radars can easily be configured to mission requirements with little or no new development.

As described further below, a stackable IS2RMA radar, in certain embodiments, provides the following advantageous features:

Provides a fully enclosed, electromagnetic interference (EMI)-shielded and weather tight integrated structure for a scalable phased array which can be formed into many different types of radar array assemblies and antenna arrays having a single, monolithic array face;

Provides a chassis having a vertical stiffener that includes an integrated cooling manifold;

Enables delivery and site installation of a fully integrated, calibrated and tested radar;

Enables rapid sensitivity growth by stacking more IS2RMA radars on top, or along the sides;

Has an integrated structure that allows multiple units to be stacked with no interruptions in the array lattice;

In certain embodiments, can adapt, make use of, and/or reuse, mature array technology to enable a tower-based radar product line.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified mechanical representations and simplified diagrams, to avoid obscuring the illustrations of the structure with connections to external components (e.g., power, control electronics, communications) and cabling and connections details, which will be readily apparent to those skilled in the art having the benefit of the description herein.

Figure 3:
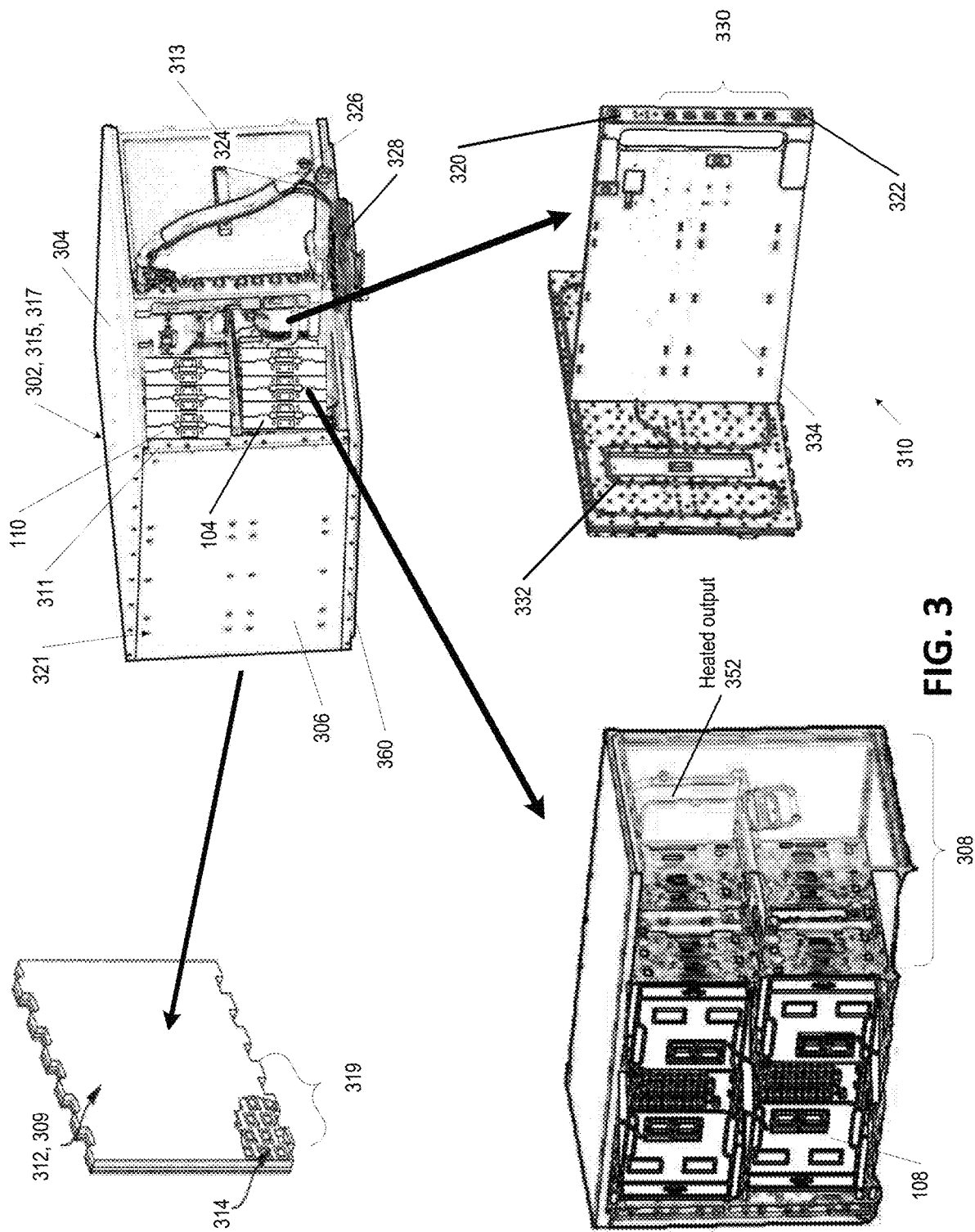
FIG. 3 an illustration of an exemplary radar building block assembly made using two radar modular assembly (RMA) radar building blocks ("IS2RMA"), including an array plate and vertical stiffener assembly in accordance with one embodiment.
Figure 4:
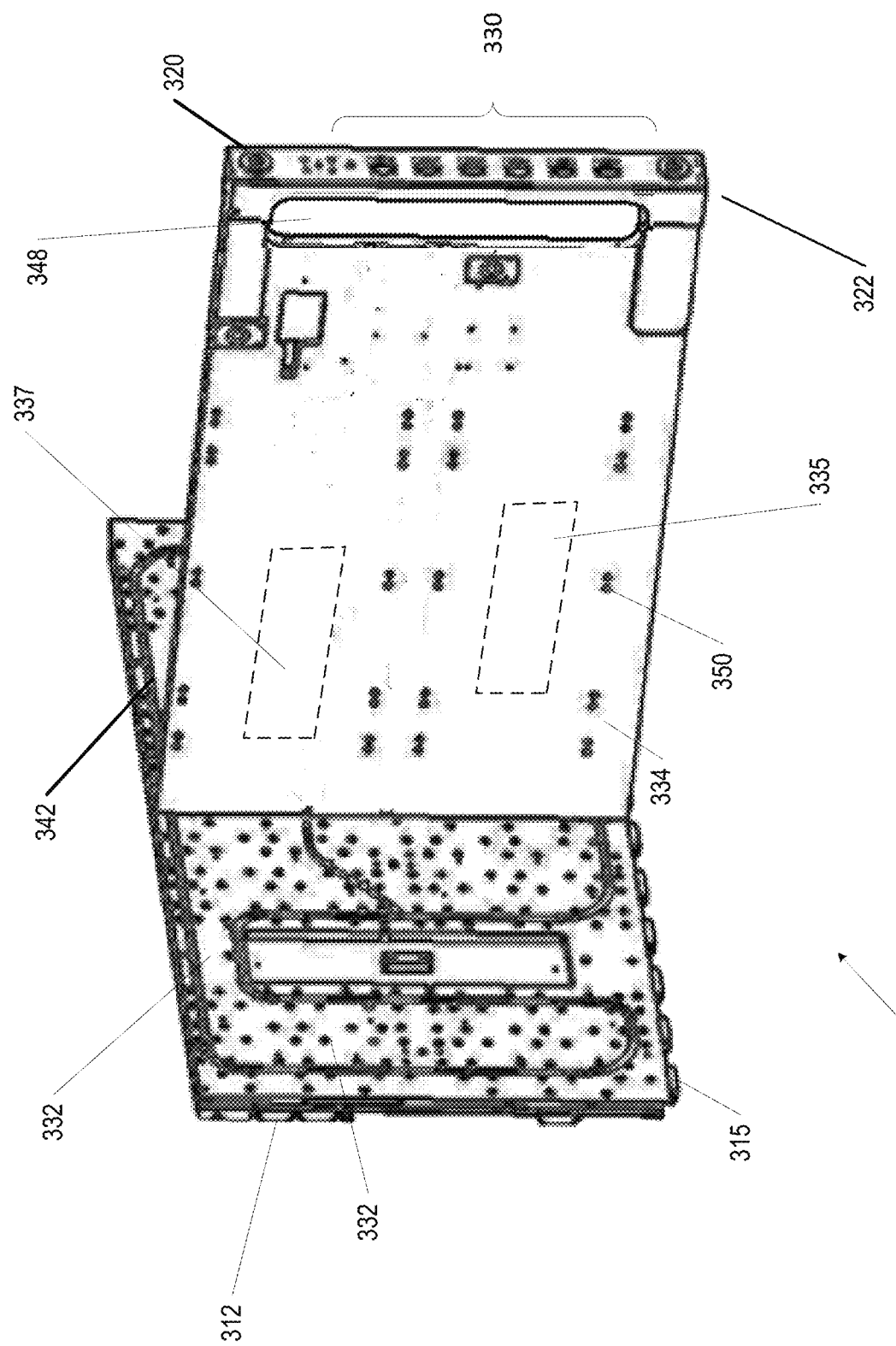
FIG. 4 is an illustration the array plate and vertical stiffener assembly of FIG. 3, in accordance with one embodiment.

FIG. 3 an illustration 300 of an exemplary radar building block assembly IS2RMA 302 made using two radar modular assembly (RMA) radar building blocks 308, and FIG. 4 is an illustration the array plate and vertical stiffener assembly 310 of FIG. 3, in accordance with one embodiment. The assembly of 2 RMA's 308, in the particular configuration herein of FIG. 3, is termed "IS2RMA" and is configured to include a specific chassis 315 (described further herein) and an array plate and vertical stiffener assembly 310 (shown in FIG. 3 and in greater detail in FIG. 4) in accordance with one embodiment, and associated array electronics 317 (see also FIG. 8A). The radar building block assembly IS2RMA 302, also referred to herein as IS2RMA 302, includes two RMAs 308 (one is shown in cut-away view in FIG. 3, showing in exposed view a synthesizer card 108. Each RMA 308 is substantially similar to the MBB/RMA 102 described previously in FIG. 1 and includes half of the array electronics 317 for the IS2RMA 302.

Each RMA 308 includes the same functional components and includes its own respective set of array electronics, where each set of array electronics includes a number of transmit/receive integrated multichannel module (TRIMM) cards 110 and their associated power and signals electronics cards, a synthesizer card, a DREX (Digital Receiver Exciter) card 106, a synthesizer 108, and an auxiliary power controller card 104. In certain embodiments, the set of array electronics contained in the MBB/RMA 308 includes all of the antenna's electronic hardware and functionality including the radiators, beamformers, TRIMMs, DREXs, and AC/DC power conversion. In certain embodiments, the set of array electronics 317 is in operable communication with a respective set of radiators in radiator assembly 314 integrated into a radome assembly 312. In certain embodiments, each set of array electronics comprises a respective plurality of radar transmit/receive (T/R) modules, each T/R module comprising power and beamforming signals, wherein the power and beamforming signals are connected in parallel to the respective set of radiators in radiator assembly 314 integrated into the radome assembly 312.

The MBB/RMA 308 building blocks operate in parallel and are standalone (smaller) radars that can be added together to adjust the radar's sensitivity, performance and size, as will be understood. It will be understood that the exact array electronics 317 shown in the figures is provided by way of illustration and not limitation and that those of skill in the art will know that the array electronics 317 can be implemented in multiple different ways. In addition, each of these functional components within the array electronics 317 are not specifically delineated in FIG. 3, because the focus in this figure is on the chassis structure and elements therein.

Each of the two respective MBB/RMAs 308 in the IS2RMA assembly 302, has its own respective integrated radiator assembly 312, which includes a plurality of radiators as part of a radiator assembly 314 (radiating elements). The integrated radiator 312 is approximately the same size as the radiator assembly 314, which comprises of multiple radiating elements. The integrated radiator 312 includes a radome 309, which in certain embodiments is a protective composite cover. Advantageously, the radome 309 is modular, as well, to enable stacking, as will be understood. The integrated radiator 312 attaches directly to the radiator assembly 314, and also is configured to be part of each MBB/RMA 308. The integrated radiator 312, in certain embodiments, is configured with an arrangement of interlocking edges 319, as will be understood in the art, to enable close and consistent spacing along the array face. Thus, the integrated radiator 312 of each MBB/RMA 308, forms part of an array face in a resulting radar, e.g., when the IS2RMA assemblies 302 are stacked and combined as described herein, as will be understood. Further, when multiple IS2RMA assemblies 302 are stacked or otherwise combined, the integrated radiator 312 allows the overall array structure to be the same size as the active array face rather than extending beyond the edges of the face.

As will be seen, because the built in support provided as part of the IS2RMA 302 assembly does not extend beyond active area of an array face formed by the plurality of integrated radiators 312 that interconnect via the lattice structure interlocking edges 319, the IS2RMA assemblies 302 can be stacked with no interruptions in the block spacing between adjacent stacked IS2RMA assemblies 302. Thus, all IS2RMA assemblies 302 can operate the same way regardless of the array size. The integral radiator 312 (including its radome 309) allows for the modular stacking approach described herein with no interruptions in the unit cell spacing between adjacent stacked IS2RMA 308 assemblies, which is detrimental to the RF performance of the system. In addition, the design of the chassis 315 and of the array plate and vertical stiffener assembly 310, further helps to improve strength of the assembly for stacking and further reduce spacing between assemblies, as described further herein.

Figure 5:
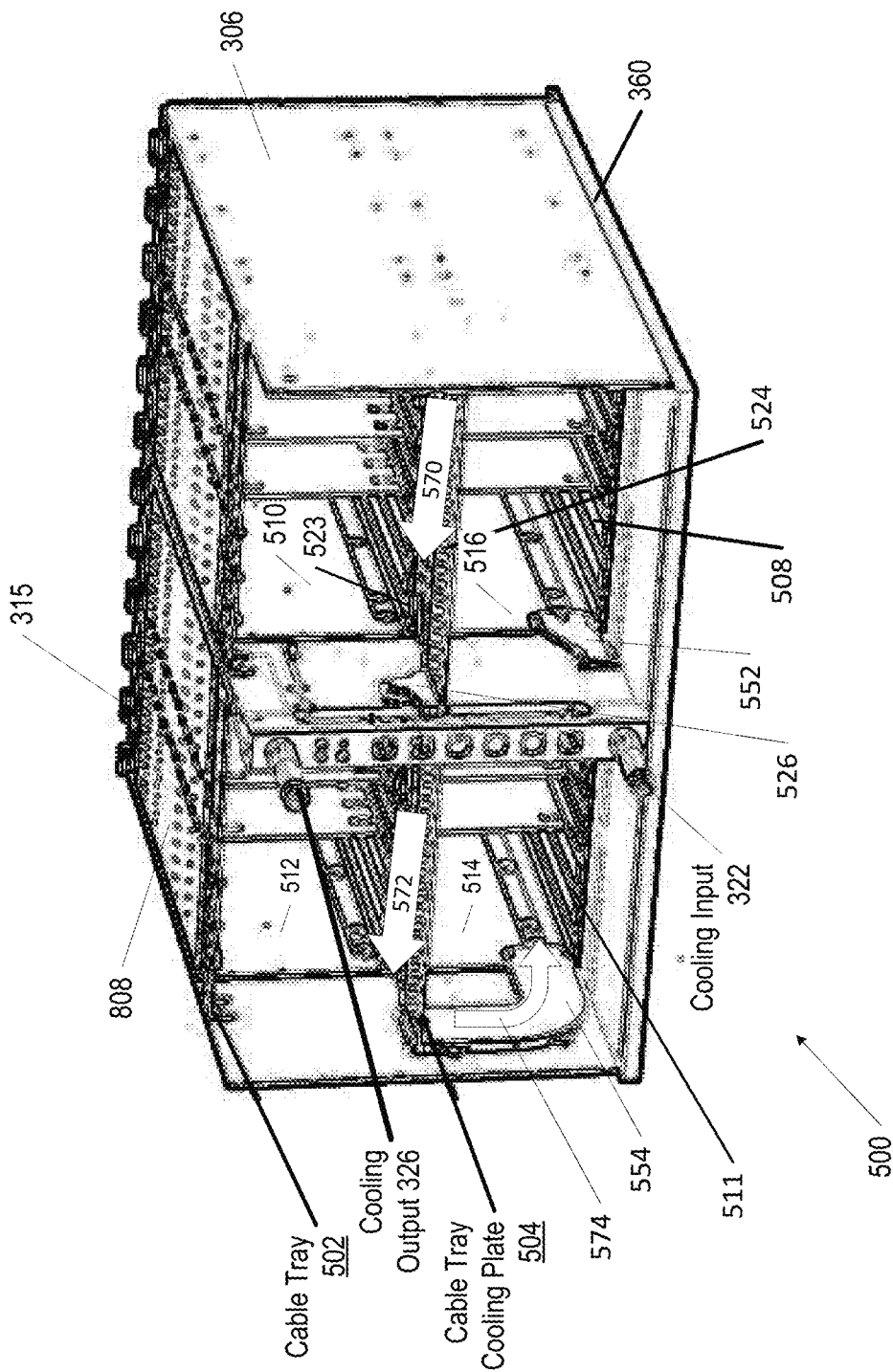
FIG. 5 is a first illustration of the chassis for the IS2RMA, showing the array plate and vertical stiffener assembly installed, and top cover plate removed, in accordance with one embodiment.
Figure 6:
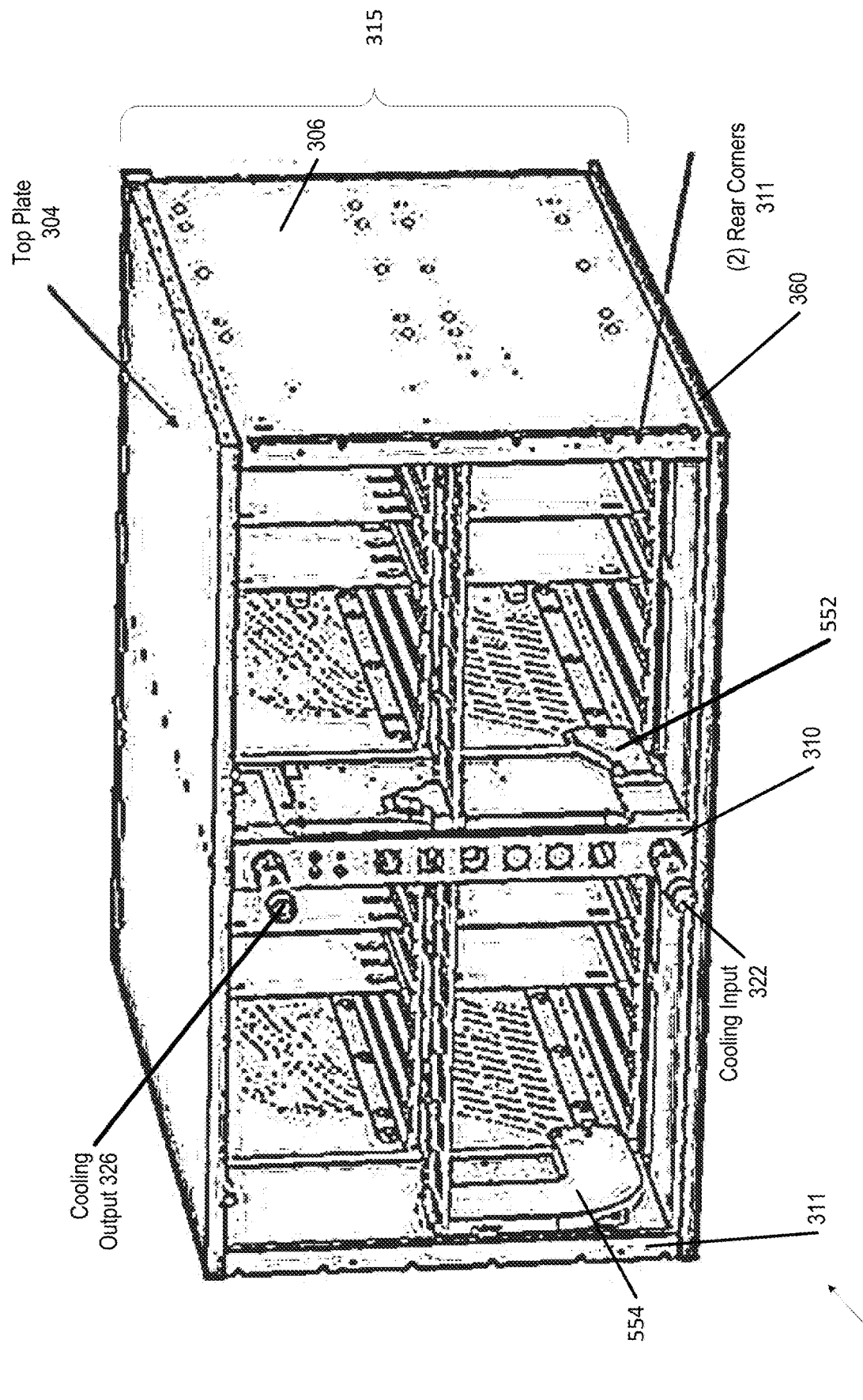
FIG. 6 is a second illustration of the chassis for the IS2RMA of FIG. 5, with the top cover plate installed, in accordance with one embodiment.
Figure 7:
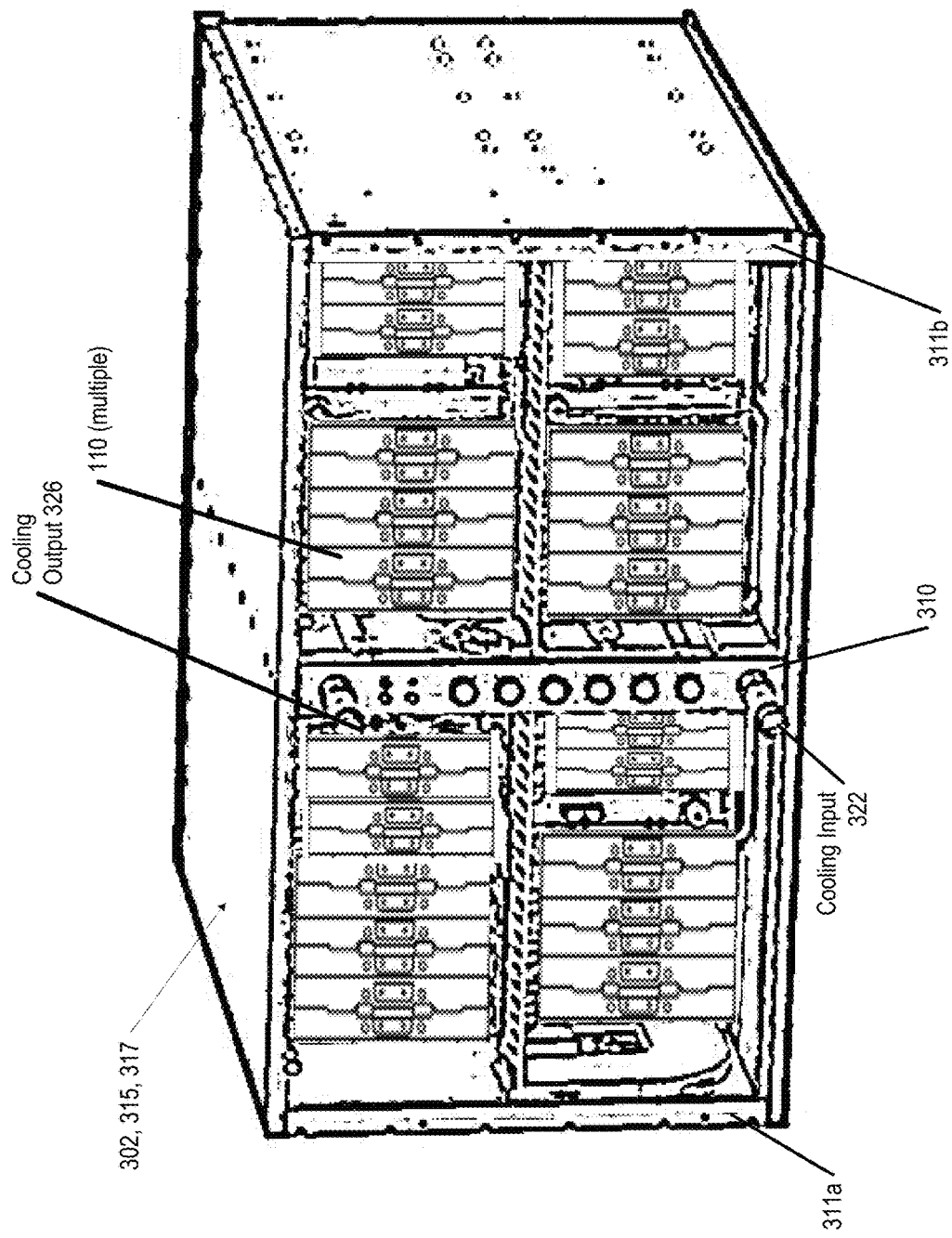
FIG. 7 is a third illustration of the chassis for the IS2RMA of FIG. 6, with the array electronics installed and both back covers removed, in accordance with one embodiment.
Figure 8A:
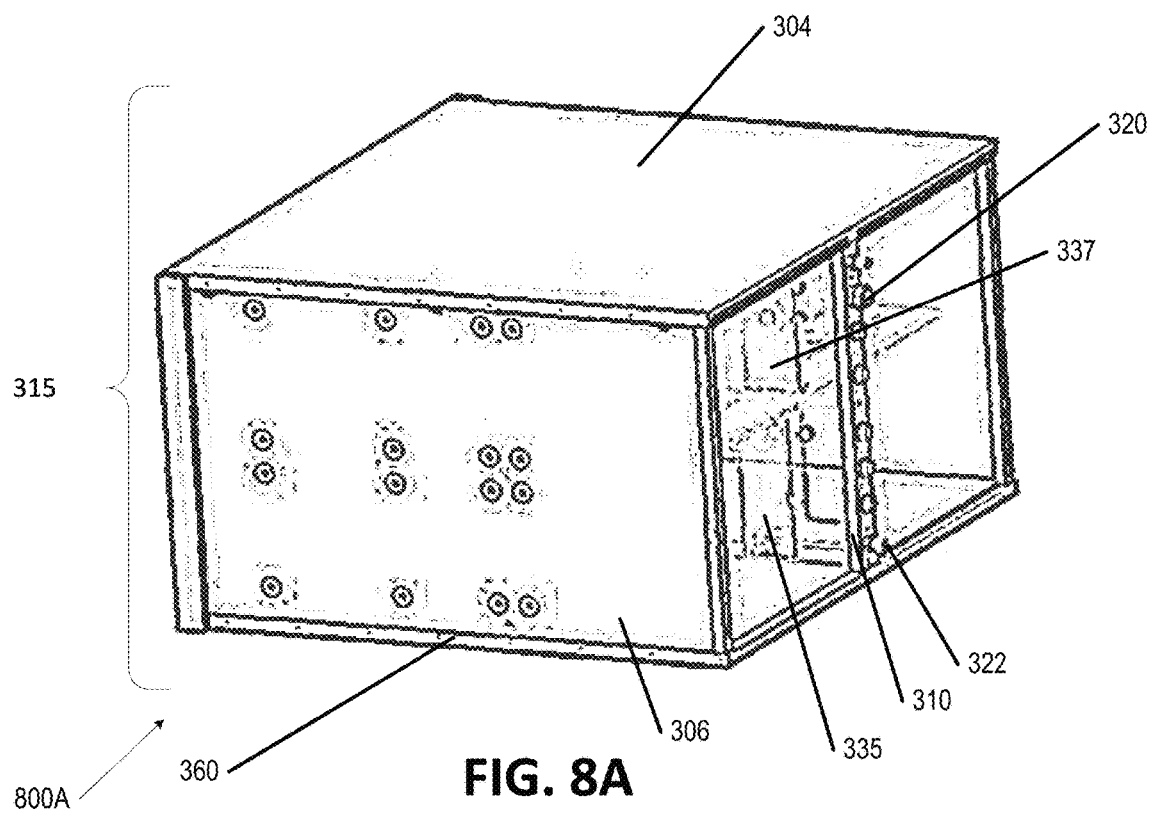
FIG. 8A is an illustration of another embodiment of an IS2RMA chassis having an array plate and vertical stiffener, showing cooling manifold paths, in accordance with one embodiment.
Figure 8B:
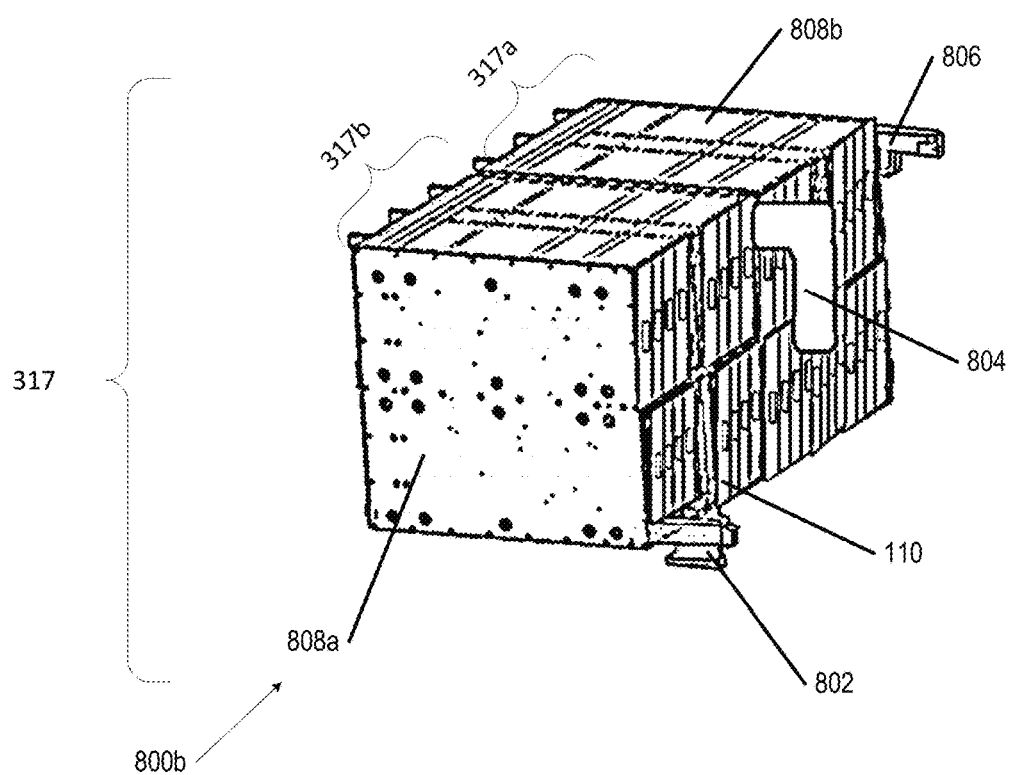
FIG. 8B is an illustration of an exemplary block of S-band array electronics for an RMA, to be installed into the chassis of FIG. 8A, in accordance with one embodiment.

FIGS. 5-8B provide further views of the chassis 315 of the IS2RMA assembly 302 and the array electronics 317 disposed therein. FIG. 5 is a first illustration 500 of the chassis 315 for the IS2RMA, showing the array plate and vertical stiffener assembly 310 installed, and top cover plate removed, in accordance with one embodiment. FIG. 6 is a second illustration 600 of the chassis for the IS2RMA of FIG. 5, with the top cover plate 304 installed, in accordance with one embodiment. FIG. 7 is a third illustration 700 of the chassis 315, for the IS2RMA of FIG. 6, with the array electronics 317 installed, and both rear doors 313 removed, in accordance with one embodiment. FIG. 8A is another view 800A of an IS2RMA chassis 315 having an array plate and vertical stiffener, showing cooling manifold paths, in accordance with one embodiment. FIG. 8B is an illustration of an exemplary block of S-band array electronics 317 for an RMA, to be installed into the chassis of FIG. 8A, in accordance with one embodiment. FIG. 8B shows that the array electronics assembly 317 include a first portion 317a and second portion 317b, which are separable at the dividing point 804. Each array electronics assembly 317a, 317b includes its own respective support structure 808a, 808b. Several cooling manifolds 802, 804, 805 also are part of the array electronics assembly 317.

Referring to FIGS. 3-8A, the chassis 315 of the IS2RMA assembly 302 (which is part of a housing for the IS2RMA assembly 302) includes a top plate 304, two side plates 306 (only one is visible in FIG. 3), a bottom plate 360, two rear corner supports 311 (only one is visible in 311) an array plate and vertical stiffener assembly 310, and a respective rear door 313 over each RMA 308 that is contained in the IS2RMA assembly 302 (for clarity and to enable additional detail to be visible, only one rear door 313 is shown in FIG. 3). The top plate 304 and bottom plate 360, as well as the rear door 313, help to ensure that the overall chassis for the IS2RMA assembly 302 is watertight and electromagnetic interference (EMI) tight, as will be understood. If the IS2RMA assembly 302 is stacked, as shown further herein, then either the top plate 304, or the bottom plate 360, is removed, so that there is no structure in between a first IS2RMA assembly 302 that is stacked on top of a second IS2RMA assembly 302 (e.g., as shown further herein in FIGS. 9A-9B, 10A-10D, 11A-11B, etc., which are discussed further below), other than the built in housing 808 of the array electronics 317. This helps to minimize spacing between the IS2RMA assemblies 302.

Each side plate 306 is made using a material capable of helping to ensure that the IS2RMA assembly 302 is watertight and EMI tight, such as aluminum, but this is not limiting. In certain embodiments, side plate 306 is made of an electrically conductive material. The overall thickness of the side plate 306 (also referred to as side panel 306) is configured and sized to help ensure that all resulting antenna elements in the array are on lattice if the IS2RMA assemblies 302 are stacked side by side. The side plate 306 differs from the supply manifold 14a and return manifold 14b that form the side covers of the chassis 11 of the radar module 10 of FIG. 1, because the side plate 306 is thinner and does not have to include part of a cooling manifold structure (thus adding to the thickness of the side plate). The side plate 306, in certain embodiments, is held on with a plurality of screws 319, as shown in FIG. 3 (for clarity, the screws 319 are not depicted in all views, but will be understood).

The array plate and vertical stiffener assembly 310 includes a vertical stiffener 334 and an array plate 332 that are operably coupled together. In certain embodiments, a groove or other mating structure is formed on the array plate 332 to enable the vertical stiffener 334 to be coupled thereto. The vertical stiffener 334 has top and bottom surfaces, as shown in FIG. 4, as well as a side that faces each cavity that it forms in the chassis 315. The array plate 332 and the vertical stiffener 334 each have a respective first side and a second side opposite the first side. In certain embodiments, the vertical stiffener 334 is coupled to the array plate 332 via a plurality of screws (not shown). In certain embodiments, the vertical stiffener 334 is coupled to the array plate 332 via an adhesive. Those of skill in the art will appreciate that there are numerous ways to couple together the array plate 332 and the vertical stiffener 334, and the examples provided herein are illustrative and not intended as limiting. For example, in some embodiments, the array plate 332 and vertical stiffener 334 are bolted together; optionally, in certain embodiments, pins may be used for alignment, as will be understood. The vertical stiffener 334, in some embodiments, is coupled to chassis 315 directly, vs being coupled to the array plate 332.

The array plate 332 is a sheet of material that is configured to provide extra support to the rear of each respective integrated radiator 312 that is associated with each respective RMA in the IS2RMA assembly 302. The array plate 332, in certain embodiments, has a size capable of providing structural integrity and support to each integrated radiator 312, including when the IS2RMA assembly 302 is stacked. The array plate 332, in certain embodiments, is implemented as a single sheet configured for supporting two integrated radiators 312. In certain embodiments, the array plate 332 can be formed as an array plate structure that can comprise one portion supporting two radiators, or as two separate array plate portions (not shown, but readily understood), each array plate portion configured to support a respective integrated radiator 312, where each respective separate array plate portion is coupled to the vertical stiffener 334. In some embodiments, the array plate 332 is formed using a single sheet of a high strength material or sufficiently rigid material, such as aluminum, but this is not limiting. The array plate 332 can be configured to enable the radome assemblies 312 connected thereto to be interlocked and aligned to create a single monolithic array face.

Those of skill in the art will appreciate that varied materials may be suitable for use in implementing the array plate 332, depending on the overall weight of the IS2RMA assembly 302, the environmental conditions in which it is to operate, cost, etc. The array plate 332 also helps to reduce the need for providing additional supports (like the support structure 122) to the overall structure of the IS2RMA assembly 302. In certain embodiments, as shown in FIG. 4, the array plate 332 includes one or more channels 342, which can be used, depending on need, for routing wiring and/or cabling, for routing of cooling liquid and/or coolant tubes, etc. For example, in at least one embodiment, the channel 342 on the array plate is configured for receiving coolant. In addition, if the array plate 332 is used to help support cooling, advantageously the array plate 332 is made of a material having good thermal conductivity. In some embodiments, as shown in FIG. 4, the array plate includes a plurality of holes or bores 321, which are used for various purposes as needed, such as passthroughs for RF connections between T/R modules and the integrated radiator assemblies, mounting of front end electronic components, etc., as will be appreciated by those of skill in the art.

The vertical stiffener 334 is formed of a material having suitable strength (e.g., aluminum) and rigidity so as to enable the chassis 315 to be resistant to buckling when stacked. In addition, in certain embodiments, the material used to make the vertical stiffener 334 is a material with good thermal conductivity, to support the cooling function described further below. The vertical stiffener 334 includes a plurality of holes or bores in which set screws 350 can be installed to enable the vertical stiffener 334 to have components or other elements of the IS2RMA 304 assembly coupled to it and also to couple internal features of the stiffener (e.g., the cooling manifold features), as will be understood. In certain embodiments, the vertical stiffener 334 includes one or more internal channels (not visible in the figures) which may be in operable communication with corresponding channels 342 on the array plate 332, to enable continuity of coolant flow between the cooling hoses and channels and the array plate 332 For example, in at least one embodiment, a channel of the vertical stiffener is configured to receive coolant and is in operable communication with one or more other channels to direct the coolant to, and receive the coolant from, those channels, such as the channels 342 on the array plate or in channels that are part of cooling ribs 511 (see below). In addition, as discussed further below, the cable tray cooling plate 504 (FIG. 5) also includes interior channels for coolant flow.

In certain embodiments, the vertical stiffener 334 also provides features (e.g., interior manifolds 335, 337 for providing cooling input and cooling return connections) to perform a cooling function for the chassis 315, to provide equivalent and/or supplemental functionality to the separate supply manifold 14a and return manifold 14b, which in the chassis 11 of FIG. 1, were disposed as part of the outer walls of the chassis 11. Having the separate supply manifold 14a and return manifold 14b, on the other sides of the chassis 11, as is done in the device of FIG. 1, along with the associated hoses to direct coolant flow, and also providing space for cabling and wiring, contributes to the overall width and thickness of the chassis 11 of FIG. 1, for example because of the need to provide connections and space for these features on these outer sides and can result in increased spacing between MRA's and their radiator assemblies, on the face of an array. This increased spacing can degrade the antenna pattern and introduce grounding issues, as noted above. In contrast, by implementing certain aspects of the cooling function, coolant flow, and/or cable support to be connected to or part of the vertical stiffener 334, this increased spacing can be reduced. In certain embodiments, this is accomplished by relocating some of the input hoses and output hoses to the vertical stiffener 334 and by also providing a cable tray/cooling plate structure coupled between the outer side plates and the vertical stiffener, as described below in connection with FIG. 5. In some embodiments herein, with the hoses and part of the cooling function/cooling manifold(s) embedded within the vertical stiffener 334 and/or array electronics 317 (particularly within active array electronics), overall space is saved in the dimensions of the chassis 315, while still providing necessary cooling functions to the active array electronics 317. In fact, in certain embodiments, embedding the cooling manifold function within active array electronics can provide improved cooling vs providing the cooling manifold on the outer walls of the chassis.

Referring to FIG. 5, the arrows 572, 574 show a direction of coolant flow within the cable tray cooling plate 504, which itself has interior channels for coolant flow, as will be understood. Referring to the RMA in the left of the image, the cable tray/cooling plate 504 and the side RMA cooling manifold 554 transport the coolant from the vertical stiffener 334 in the middle, in the direction of arrows 572 and 574, to the supply at side plates 306. Then the coolant flows thru the side RMA cooling manifold 554, back to the vertical stiffener 334 in the center. For the RMA on the right of the image, the interior channels of the cable tray/cooling plate 504 brings the (now heated) coolant back to the vertical stiffener 334, in the direction of arrow 570.

As is known, the array electronics 317, especially active array electronics such as transmit/receive (T/R) modules, produce high amounts of heat which must be dissipated or else the active circuits (e.g., power amplifiers) will cease to operate properly. To provide cooling as part of the vertical stiffener 334, the vertical stiffener 334 includes a supply manifold 335 having channels that receive coolant at the port 322, e.g., via supply hose 326. FIG. 8A depicts the locations of the supply manifold 335 and the return manifold 337, but these locations are not, of course, limiting. The locations could be reversed, for example. In certain embodiments, the cooling manifold of the vertical stiffener 334 (e.g., the supply manifold 335 and the return manifold 337) is an integrated manifold that is built into the vertical stiffener 334. The coolant is circulated throughout the chassis 315 and removed via the return manifold 337 (FIG. 6, FIG. 8A) out the coolant output port 320, via coolant return hose 324. As is understood, the chassis 315, in certain embodiments, also performs as a heat sink drawing the heat away from the active circuits (e.g., in the T/R modules), especially if the chassis 315 is formed using material with good thermal conductivity, such as a metallic material. In some embodiments, as shown in FIG. 4, the vertical stiffener 334 includes set screws 350 attached to the supply manifold 335 and to the return manifold 337.

As seen in FIGS. 3-8A, the vertical stiffener 334 provides a cooling intake port 322, which can be coupled to a supply hose 326 for coolant intake (FIG. 4), and a cooling connections that are coupled to a cooling return hose 324 (FIG. 4) The vertical stiffener 334, when coupled to the array plate 332 and when positioned between the side plates 306, the cover plate 304 and the bottom plate 360, form four cavities 510, 512, 514, 516, (FIG. 5) in which the array electronics 317 (FIG. 8B) are disposed.

Referring to FIG. 5, in certain embodiments, the chassis 315 includes additional cooling functionality within the cavities 510, 512, 514, 516. In addition, further cooling is provided, in certain embodiments, via a top cold plate 523 and a bottom cold plate 508 disposed at the top side and bottom side, respectively of each respective cavity 510, 512, 514, 516. In addition, cooling is provided to the edges of the TRIMMs in the cavities 510, 512, 514, 516. Note that, when the IS2RMA assembly 302 is stacked onto another IS2RMA assembly 302 (e.g., as discussed herein in connection with FIGS. 9A-12c, for example), the bottom cold plate 508 helps to hold in the various electronics and modules, but there is no bottom plate 360 (bottom cover), because the IS2RMA assembly 302 is directly coupled to the top of another IS2RMA assembly 302 (which has its top cold plate 523 removed, as well). The chassis 315 also can include additional built in supports for routing cables, such as cable tray 503. The chassis 315 also includes a plurality of slots (not visible in the figures) to hold TRIMMs 110 and other array electronics, where the slots are disposed on either side of a plurality of cooling ribs 511. In certain embodiments, the slots and cooling ribs 511 together form a support structure for the array electronics. In certain embodiments, the top cold plate 523 and bottom cold plate 508, respectively also include cooling ribs 511 that include channels (not shown) to carry coolant. Gaps between the cooling ribs 511 form slots (not visible, but well understood) that hold the TRIMMs 110 and other array electronics in a parallel configuration, which contributes to efficient cooling of the array electronics.

Figure 9A:
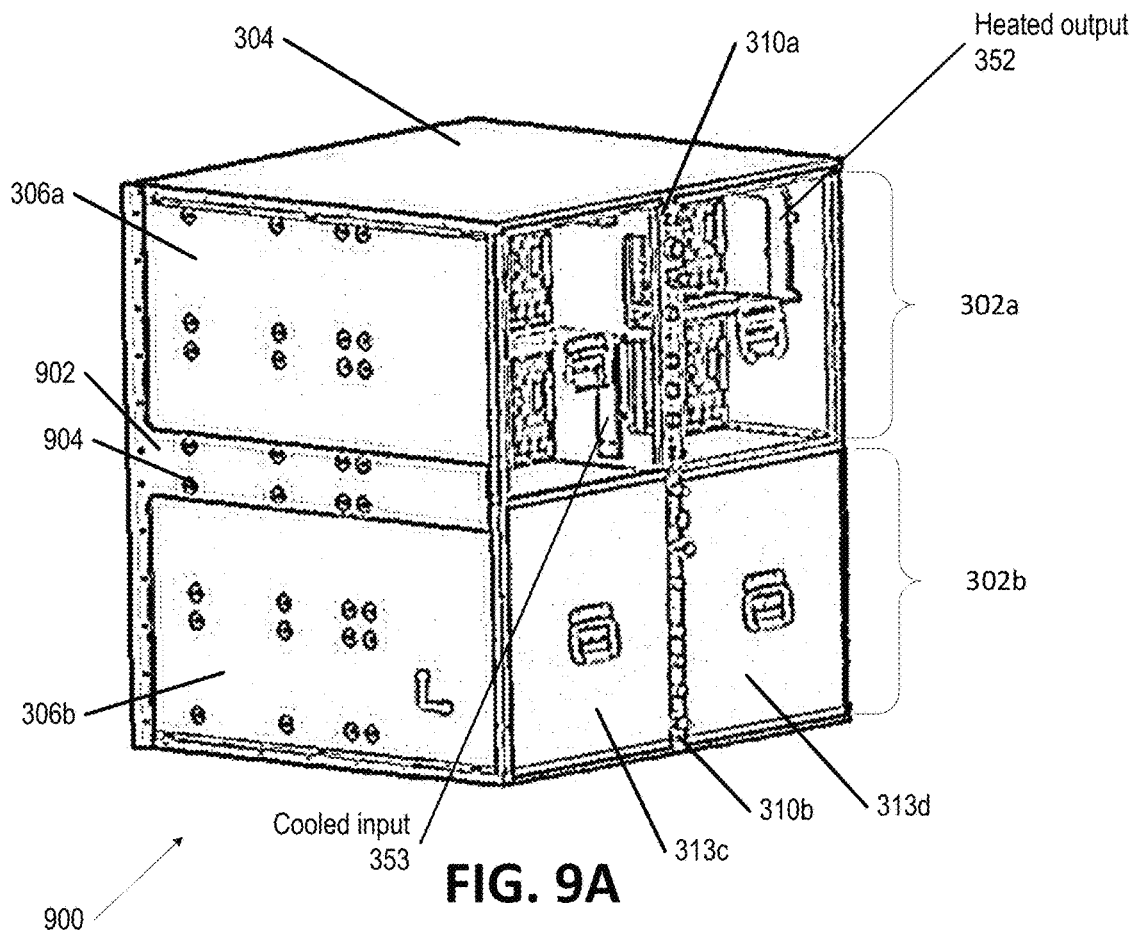
FIG. 9A is an illustration of an exemplary 4-RMA radar made from a stack of two IS2RMAs, coupled together and including a splice plate, in accordance with one embodiment.
Figure 9B:
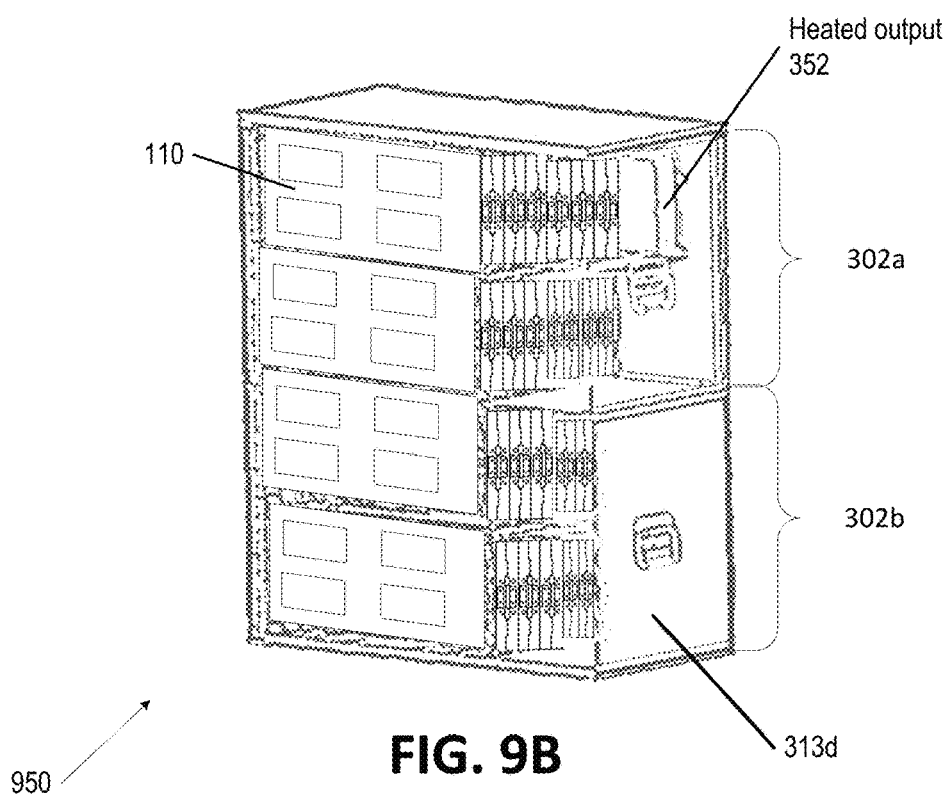
FIG. 9B is an illustration of a cut-away view of the exemplary 4-RMA radar of FIG. 9A, in accordance with one embodiment.

The above-described IS2RMA assembly 302, with its self-support built in, provides a fully enclosed, EMI-shielded, weather tight, stackable integrated structure for a scalable phased array. For example, FIG. 9A is an illustration of an exemplary 4-RMA radar 900 made from a stack of a first IS2RMAs 302a and a second IS2RMA 302b, coupled together. FIG. 9B is an illustration of a cut-away view 950. of the exemplary 4-RMA radar 900 of FIG. 9A, in accordance with one embodiment and including a splice plate, in accordance with one embodiment. To show internal details of the first IS2RMA 302a, the rear doors 313a, 313b for the first IS2RMA 302a, are shown as being removed, but the rear doors 313c, 313d for the second IS2RMA 302b, are in place. The rear doors 313 are also EMI-tight and water-tight. As will be appreciated, the rear doors 313 instead could be replaced with corresponding rear covers. In addition, in the 4-RMA radar 900, the connector feed throughs also are selected to be EMI-tight and watertight.

Referring first to FIG. 9A, the top plate 304, which is coupled to the top of the first IS2RMA 302a, ensures that the 4-RMA radar 900 will have a watertight and EMI-tight enclosure at its top. Similarly, the bottom plate 360, which is coupled to the bottom of the second IS2RMA 302b, ensures that the 4-RMA radar 900 will have a watertight and EMI-tight enclosure at its bottom. As FIG. 9A and FIG. 9B both show, there is no structure or other support needed in between the first IS2RMA 302a and the second IS2RMA 302b.

To further ensure that the entire enclosure of the 4-RMA radar 900 is watertight and EMI-tight, in certain embodiments, a splice plate 902 is attached to a side of the 4-RMA radar 900, e.g., via a plurality of set screws 904, where the splice plate 902 is configured to couple the first IS2RMA 302a to the second IS2RMS 302b. The splice plate 902 couples to the side plate 306a of the first IS2RMA 302a and to the side plate 306b of the second IS2RMA 302b, as shown in FIG. 9A. Although not visible in the perspective view of FIG. 9A, in certain embodiments, the other side of the 4-RMA radar 900 also has a corresponding splice plate 902 similarly attached to those other side panels of each of the first IS2RMA 302a and second IS2RMA 302b. Embodiments with a pair of splice plates 902 are shown, for example in FIGS. 10A-12C (discussed further herein). In embodiments where the IS2RMA assembly 302 is not stacked but is instead placed side by side with no stacking (e.g., FIG. 12D), no splice plate 902 is required along the side, but, a splice plate instead could be placed along the top side or bottom side, as will be understood.

Figure 10A:
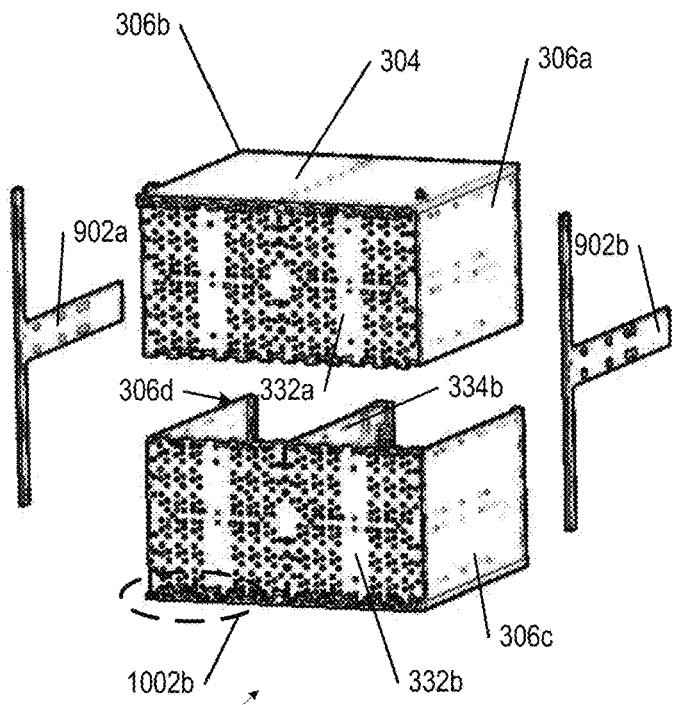
FIG. 10A is a partially exploded illustration of a partially assembled chassis for the 4-RMA radar of FIG. 9A, showing front view of the array plate and vertical stiffeners, before the antenna radiators are installed, in accordance with one embodiment.
Figure 10B:
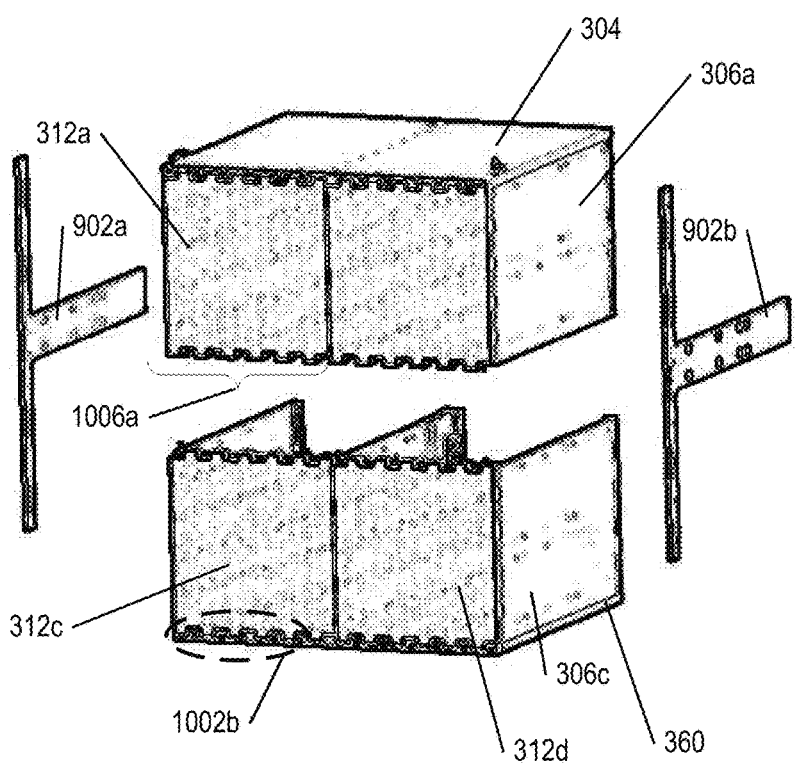
FIG. 10B is a partially exploded illustration of a partially assembled chassis for the 4-RMA radar of FIG. 9A and of FIG. 10A, showing front view of partially assembled chassis after the antenna radiators are installed, in accordance with one embodiment.

FIG. 10A is a partially exploded illustration 1000 of a partially assembled chassis 315 for the 4-RMA radar of FIG. 9A, showing front view of the array plates 332a, 332b and one of the vertical stiffeners 334b (vertical stiffener 334a is not visible in FIG. 10A), before the antenna radiators 312 (not shown in FIG. 10A) are installed. As FIG. 10A shows, the serrated portion 1002b is configured as part of bottom plate 306c, so that it can mate to the radiator 312b as shown in FIG. 10B. FIG. 10B is a partially exploded illustration 1-25 of a partially assembled chassis 315 for the 4-RMA radar of FIG. 9A and of FIG. 10A, showing front view of partially assembled chassis after the antenna radiators 312a, 312b, 312c, 312d are installed, in accordance with one embodiment. As FIGS. 10A and 10B show, the serrated region 1004 at the bottom of the array plate 332a of the top IS2RMA chassis is configured to mate to the corresponding serrated edges at the top of the array plate 332b of the bottom IS2RMA chassis. However, when the integrated radiators 312a, 312b, 312c, 312d are attached (FIG. 10B), the top two integrated radiators 312a, 312b are configured to have their top serrated edges mate with the serrated edges on the cover plate 304, and their bottom serrated edges (e.g., 1006a) mate with the serrated edges of the top of the corresponding bottom two integrated radiators 312c, 312d. Then, the bottom serrated edges of the bottom two integrated radiators 312c, 312d, mate with the serrated edges on the bottom plate 360. This arrangement helps to minimize spacing between the integrated radiators 312 of the 4-RMA radar 900.

Figure 10C:
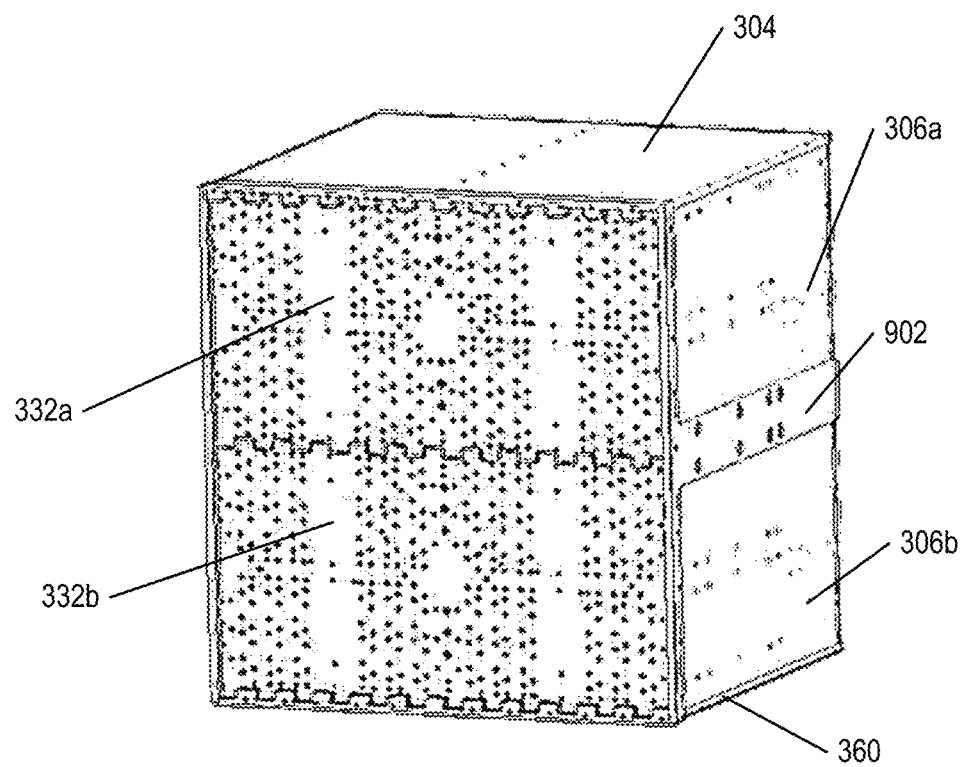
FIG. 10C is an illustration of a partially assembled chassis for the 4-RMA radar of FIG. 9A, showing a front view of the exploded assembly of FIG. 10A as fully assembled, before the antenna radiators are installed, in accordance with one embodiment.
Figure 10D:
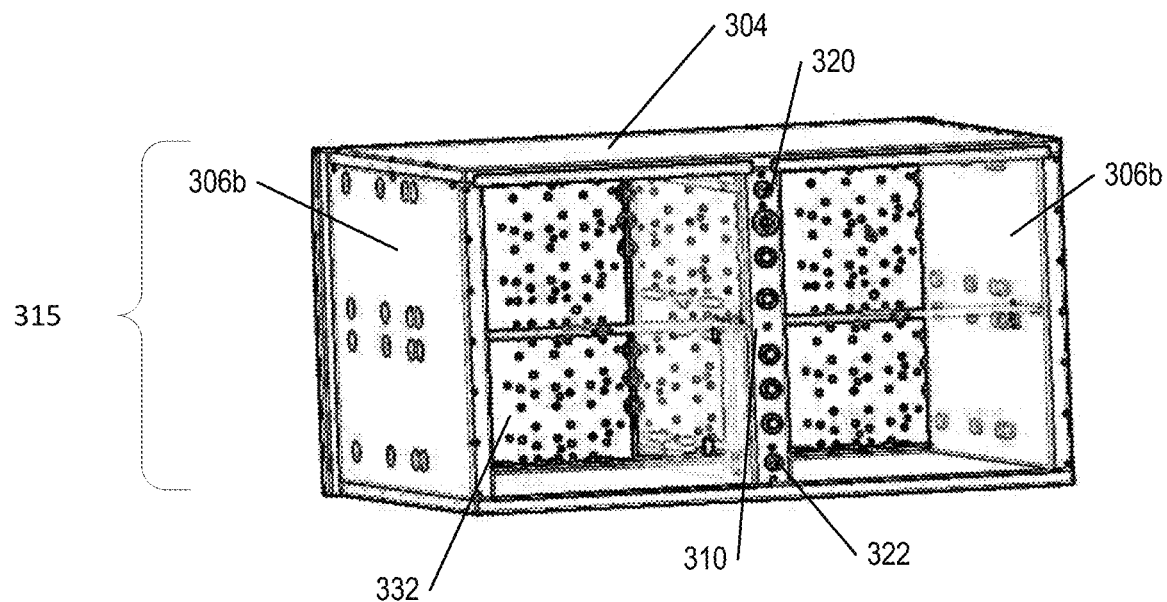
FIG. 10D is a rear view of a partially assembled chassis for a two-RMA radar, showing a rear view of the array plate and vertical stiffeners as installed into the chassis, in accordance with one embodiment.
Figure 11A:
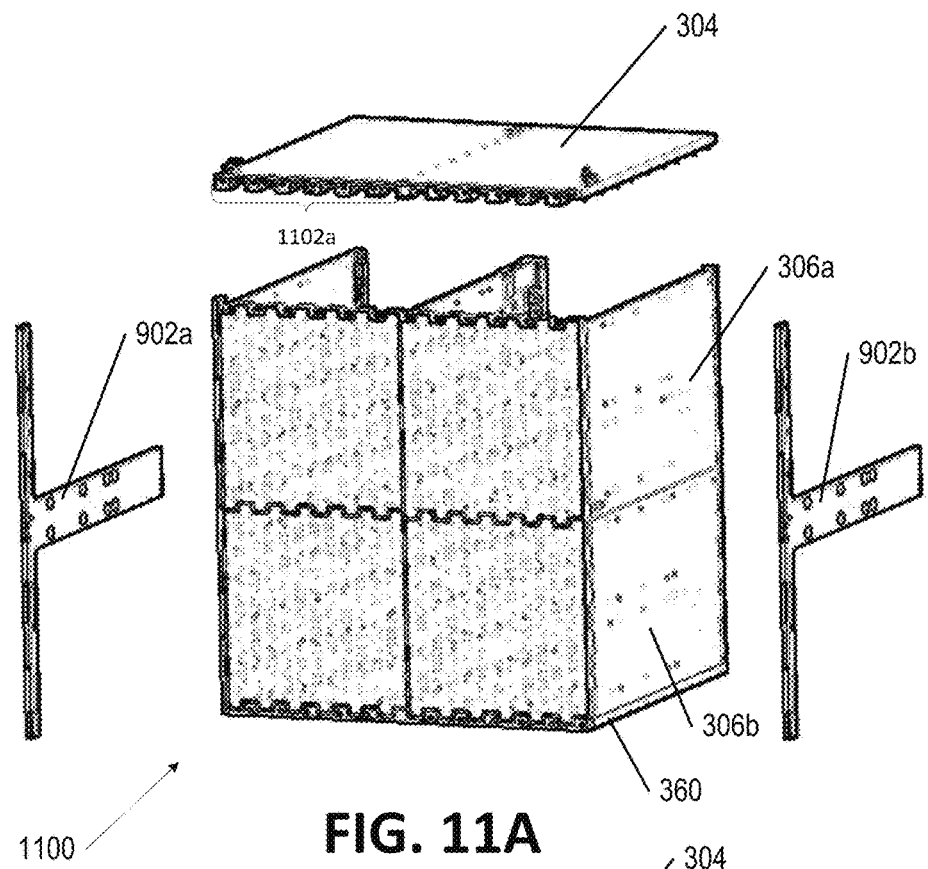
FIG. 11A is a front view of a partially assembled chassis for the 4-RMA radar of FIG. 9A, showing the top cover plate not yet attached, in accordance with one embodiment.
Figure 11B:
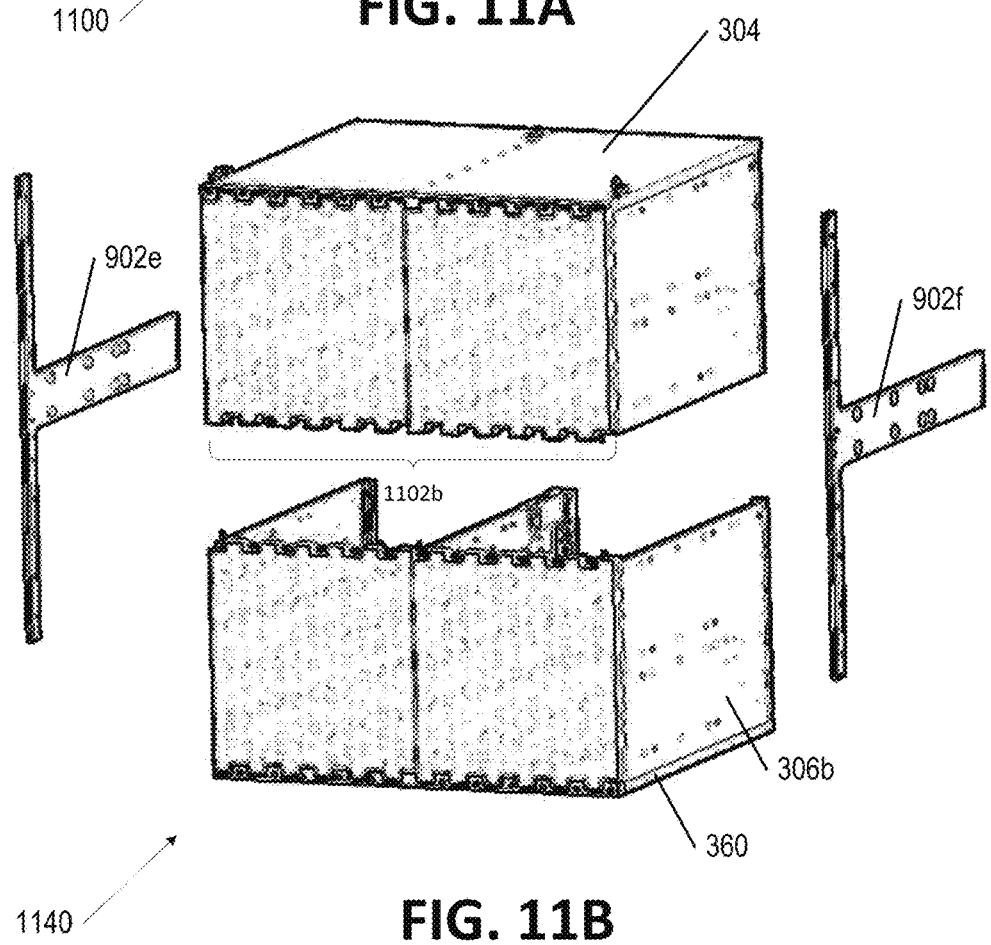
FIG. 11B is a front view of a partially assembled chassis for the 4-RMA radar of FIG. 9A, showing the top RMA and the bottom RMA before being assembled together, in accordance with one embodiment.

FIG. 10C is an illustration 1050 of a partially assembled chassis for the 4-RMA radar of FIG. 9A, showing a front view of the exploded assembly of FIG. 10A as fully assembled, before the antenna radiators 312 are installed, in accordance with one embodiment. FIG. 10D is a rear view of a partially assembled chassis 315 for a two-RMA radar, showing a rear view of the array plate 332 and vertical stiffener 334 as installed into the chassis 315, in accordance with one embodiment;

FIG. 11A is a front view 1100 of a partially assembled chassis 315 for the 4-RMA radar 900 of FIG. 9A, showing the top cover plate 304 not yet attached and the first splice plate 902c and second splice plate 902d, not yet attached. in accordance with one embodiment. FIG. 11B is another front view 1150 of a partially assembled chassis 315 for the 4-RMA radar 900 of FIG. 9A, showing the top IS2RMA 302a and the bottom IS2RMA 302b before being assembled together, in accordance with one embodiment (the array electronics 317 are not visible in these views).

FIGS. 12A-12C show high level steps that depict how to double a radar, in certain embodiments, using the configurations described above. FIG. 12A is a front view of a first part 1200 of an exemplary arrangement to double a radar, in accordance with one embodiment. In FIG. 12A, at the start, there is a 2-RMA radar assembly IS2RMA 302a. FIG. 12B is a front exploded view 1210 of a second part of an exemplary arrangement to double the radar 302a of FIG. 12A, in accordance with one embodiment. As FIG. 12B shows, the top plate of IS2RMA 302a is removed, and another IS2RMA radar 302b is placed on top, but with its bottom plate 360 removed, such that there no divider between the top IS2RMA 301a and the bottom IS2RMA 301b. Then the splice plates 902a, 902b are bolted onto the sides. FIG. 12C is a front view 1250 of a third part of the exemplary arrangement to double a radar, in accordance with one embodiment, showing the 4-RMA radar assembly.

Figure 12D:
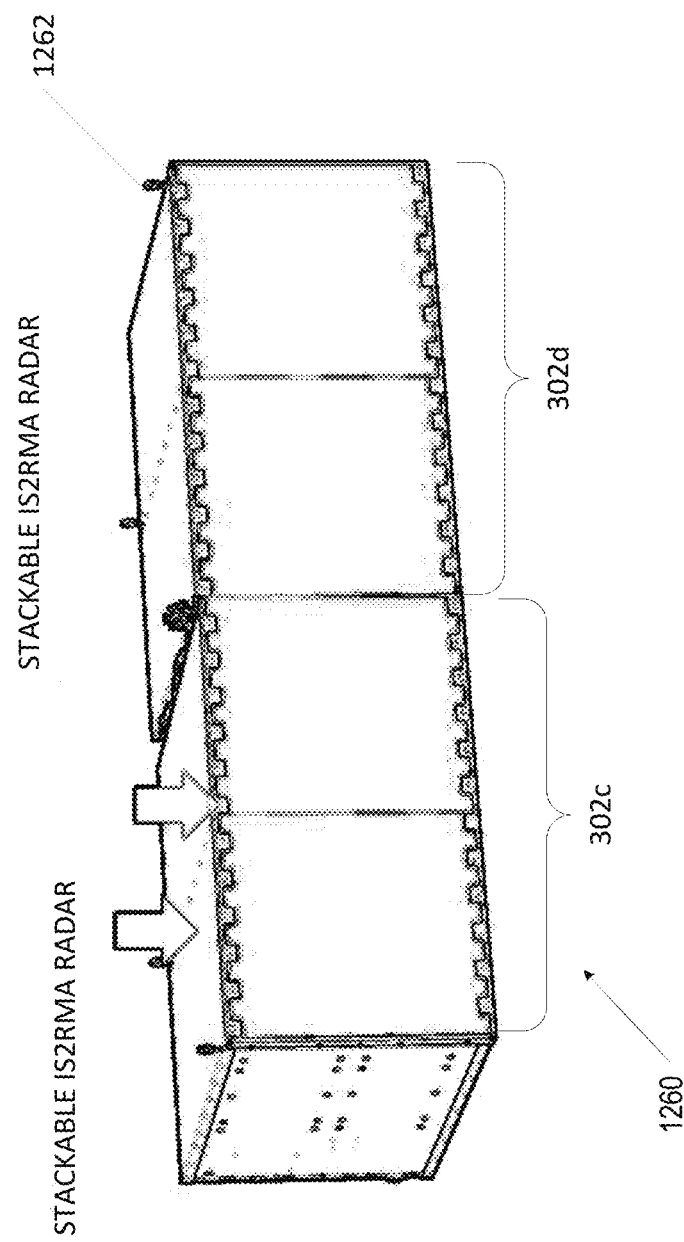
FIG. 12D is a front view of another arrangement to double a radar, showing a side by side arrangement, in accordance with one embodiment.

As will be appreciated, many different combinations of the IS2RMA assembly 302 can be combined and stacked similar to the manner described above. For example, FIG. 12D is a front view of another arrangement 1260 to double a radar, showing a side by side arrangement of a first IS2RMA assembly 302c and a second IS2RMA assembly 302d, in accordance with one embodiment. As will be understood in the art, an additional bottom splice plate (not shown) may be usable, in certain embodiments, to couple the first IS2RMA assembly 302c to the second IS2RMA assembly 302d. In some embodiments, the IS2RMA assembly may include one or more lifting rings 1262. In addition, FIGS. 13A-13E illustrate additional combinations or portions of combinations that may be possible (note that the splice plate for FIG. 13C, with a stack of three IS2RMA's 302, is modified to be suitable for attaching three IS2RMA's.

FIG. 13A is a rear perspective view of an exemplary single RMA radar 1300 in 1×1 arrangement, in accordance with one embodiment. The single RMA radar 1300 differs from the RMA of FIG. 1 because the single RMA radar of FIG. 13A has a chassis that incorporates features of the one shown in FIGS. 3-4 for the IS2RMA assembly 302. That is, the single RMA radar includes an array plate and vertical stiffener assembly, including array plate 332 (not visible but location indicated) behind the integrated radiator 312, as well as a vertical stiffener 334 with built in cooling functions, including a supply manifold 335, return manifold 337, coolant input port 322, and coolant output port 320. The single RMA radar 1300 could be coupled to the side of an IS2RMA assembly 302, if an odd number of RMAs is desired (e.g., 3) and also stacked atop other single RMA radars 1300, in certain embodiments. For example, assume that a 3×2 radar is desired. The single RMA radar 1300 can be stacked atop another single RMA radar 1300 and then coupled to a 2×2 radar (e.g., as shown in FIG. 13B). In addition, as will be understood by those of skill in the art, for a stack that is the width of a single RMA, covers would be required over the cooling ports in the vertical stiffener assembly 310.

Figure 13D:
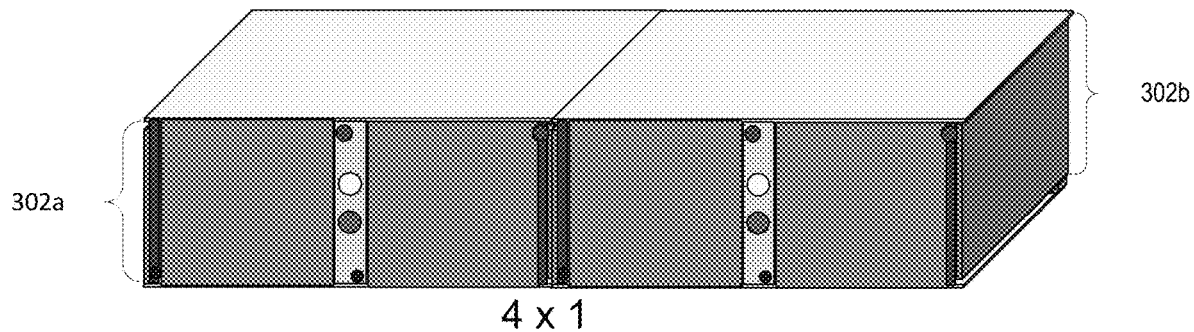
FIG. 13D is a rear perspective view of an exemplary RMA radar in a 4×1 arrangement, in accordance with one embodiment.
Figure 13E:
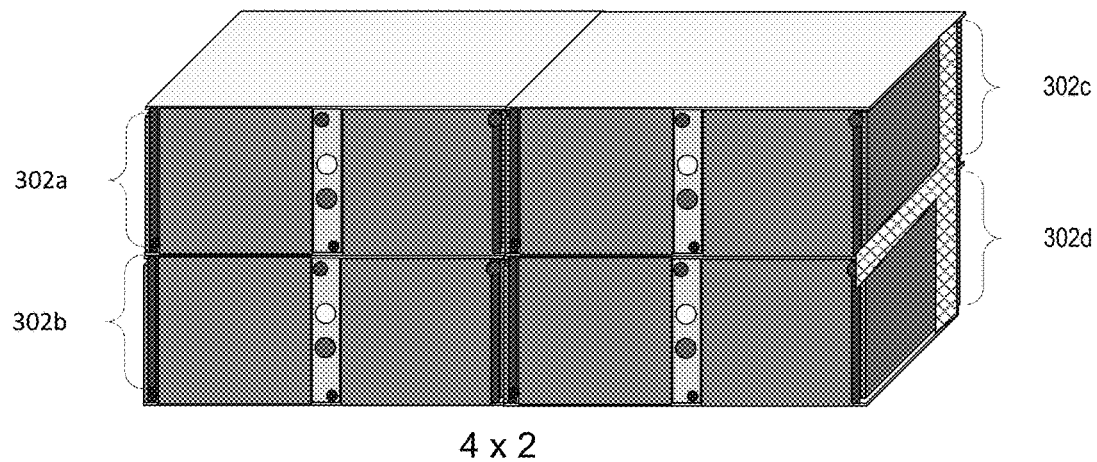
FIG. 13E is a rear perspective view of an exemplary RMA radar in a 4×2 arrangement, in accordance with one embodiment.

FIG. 13B is a rear perspective view of an exemplary RMA radar in a 2×2 arrangement, in accordance with one embodiment. This arrangement is similar to the 4 RMA radar of FIG. 12C but shown from a rear view. FIG. 13B also illustrates coolant distribution within the side panels 306 of the chassis for each IS2RMA 301a, 302b. For example, the connection 1302 is for an intake of coolant and correlates to the same approximate location as the cooling manifold 554 in FIG. 5. Connection 1303 is for a direction of output of heated coolant. FIG. 13C is a rear perspective view of an exemplary RMA radar in a 2×3 arrangement, in accordance with one embodiment. The 2×3 radar of FIG. 13C has a modified splice plate 903 that is configured to couple together (and provide a watertight seal and EMI-tight seal) to a stack of 3 IS2RMA assemblies 302. FIG. 13D is a rear perspective view of an exemplary RMA radar in a 4×1 arrangement, in accordance with one embodiment. The 4×1 radar of FIG. 13D is similar to the 4×1 radar of FIG. 12D but shown from a rear view. FIG. 13E is a rear perspective view of an exemplary RMA radar in a 4×2 arrangement, in accordance with one embodiment.

The IS2RMA assembly 302 can be implemented as a building block to create and configure many different types of radar systems beyond those explicitly shown and described herein, as will be appreciated, including non-military applications such as 5G systems, commercial radar systems (Federal Aviation Administration (FAA), weather, mapping, navigation, etc.), and commercial surveillance radar systems. As those of skill in the art will appreciate, the IS2RMA assembly 302 and its advantageous features (such as the array plate and vertical stiffener assembly that includes integrated cooling functions) have commercial applicability as well, including as part of any type of stackable backend processing that may require integrated cooling, even if no radar functionality is required.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" and "module" may include either a single component or a plurality of components, which are either active and/or passive and are connected or otherwise coupled together to provide the described function. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, the total number of elements or components shown is not intended to be limiting; those skilled in the art can recognize that the number of a particular component or type of element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A radar array assembly comprising:
a first chassis configured to house a first set of array electronics and a second set of array electronics;
a first vertical stiffener disposed within and operably coupled to the first chassis to enable the first chassis to be resistant to buckling and to define a first cavity in which the first set of array electronics is disposed and a second cavity in which the second set of array electronics is disposed, wherein the first vertical stiffener is configured to be embedded within the first set of array electronics and the second set of array electronics, wherein the first vertical stiffener comprises a first integrated cooling manifold configured to cool both the first set of array electronics and the second set of array electronics; and
a first array plate having a first side and a second side opposite the first side, the first array plate coupled to the first vertical stiffener;
wherein the first vertical stiffener and the first array plate, in combination with the first chassis, provide a built-in self-support for the radar array assembly.

2. The radar array assembly of claim 1, wherein:
the first chassis comprises a first channel configured to allow coolant flow of a fluid coolant therethrough;
the first vertical stiffener comprises a second channel configured to allow coolant flow of the fluid coolant therethrough; and
the first and second channels are in fluid communication.

3. The radar array assembly of claim 2, wherein:
the first array plate comprises a third channel configured to allow coolant flow of the fluid coolant therethrough; and
the third channel is in fluid communication with at least one of the first and second channels.

4. The radar array assembly of claim 1, wherein:
the first array plate is configured to support first and second radiator assemblies that are in operable communication with, respectively, the first set of array electronics and the second set of array electronics; and
the first array plate is configured to enable the first radiator assembly and the second radiator assembly to be interlocked and aligned to create a single monolithic array face.

5. The radar array assembly of claim 4, wherein the first vertical stiffener and the first array plate, in combination with the first chassis, are configured to enable the first chassis to be stacked on top of a second chassis that is identical to the first chassis in order to double a size of the single monolithic array face.

6. The radar array assembly of claim 1, wherein:
a first portion of the first array plate is associated with the first set of array electronics and a second portion of the first array plate is associated with the second set of array electronics;
the radar array assembly further comprises:
a first radiator assembly operably coupled to the first portion of the first array plate and configured for operable communication with the first set of array electronics; and
a second radiator assembly operably coupled to the second portion of the first array plate and configured for operable communication with the second set of array electronics; and
the first array plate is configured to support the first radiator assembly and the second radiator assembly and is configured to enable the first radiator assembly and the second radiator assembly to be interlocked and aligned to create a single monolithic array face.

7. The radar array assembly of claim 1, wherein:
the first array plate is configured to support first and second radiator assemblies that are in operable communication with, respectively, the first and second sets of array electronics;
the first array plate is configured to enable the first radiator assembly and the second radiator assembly to be interlocked and aligned to create a single monolithic array face; and
the radar array assembly further comprises:
a second chassis operably coupled to the first chassis, the second chassis configured to house a third set of array electronics and a fourth set of array electronics, wherein the third set of array electronics and the fourth set of array electronics are coupled to the second chassis via a respective second support structure contained within the second chassis;
a second vertical stiffener disposed within and operably coupled to the second chassis so as to enable the second chassis to be resistant to buckling and to define a third cavity in which the third set of array electronics is disposed and a fourth cavity in which the fourth set of array electronics is disposed, wherein the second vertical stiffener is configured to be embedded within the third set of array electronics and the fourth set of array electronics, wherein the second vertical stiffener comprises a second integrated cooling manifold configured to cool both the third set of array electronics and the fourth set of array electronics; and
a second array plate having a first side and a second side opposite the first side, the second array plate coupled to the second vertical stiffener, wherein the second array plate is configured to support third and fourth radiator assemblies that are in operable communication with, respectively, the third and fourth sets of array electronics, wherein the second array plate is configured to enable the third and fourth radiator assemblies to be interlocked and aligned to the first radiator assembly and the second radiator assembly as part of the single monolithic array face.

8. The radar array assembly of claim 7, wherein:
the first chassis comprises a first side disposed adjacent the first cavity and a second side disposed adjacent the second cavity; and
the second chassis is operably coupled to the first chassis along one of the first and second sides.

9. The radar array assembly of claim 7, wherein the second chassis is stacked on top of the first chassis.

10. The radar array assembly of claim 9, wherein:
the first chassis comprises a first side disposed adjacent the first cavity and a second side disposed adjacent the second cavity;
the second chassis comprises a third side disposed adjacent the third cavity and a fourth side disposed adjacent the fourth cavity; and
the radar array assembly further comprises a splice plate configured to secure at least one of the first and second sides of the first chassis to at least one of the third and fourth sides of the second chassis.

11. The radar array assembly of claim 1, further comprising:
a top plate operably coupled to a top of the first chassis and configured to cover a top surface of the first vertical stiffener, a top side of the first cavity, and a top side of the second cavity; and
a bottom plate operably coupled to a bottom of the first chassis and configured to cover a bottom surface of the first vertical stiffener, a bottom side of the first cavity, and a bottom side of the second cavity;
wherein the top plate, the bottom plate, and the first chassis cooperate to provide a housing for the first set of array electronics and the second set of array electronics that is watertight and electromagnetic interference (EMI) tight.

12. A radar module, comprising:
a first set of array electronics in operable communication with a first set of radiators integrated into a first radiator assembly;
a second set of array electronics in operable communication with a second set of radiators integrated into a second radiator assembly;
a chassis configured to house the first set of array electronics and the second set of array electronics, wherein the first set of array electronics and the second set of array electronics are coupled to the chassis via a respective support structure contained within the chassis;
a vertical stiffener disposed within and operably coupled to the chassis so as to enable the chassis to be resistant to buckling, the vertical stiffener configured to be embedded within the first set of array electronics and the second set of array electronics and configured to define, in the chassis, a first cavity in which the first set of array electronics is disposed and a second cavity in which the second set of array electronics is disposed, wherein the vertical stiffener comprises an integrated cooling manifold configured to cool both the first set of array electronics and the second set of array electronics; and
an array plate having a first side and a second side opposite the first side, the array plate coupled to the vertical stiffener and configured to support the first radiator assembly and the second radiator assembly, wherein the array plate is configured to enable the first radiator assembly and the second radiator assembly to be interlocked and aligned to create a single monolithic array face for the radar module such that the vertical stiffener and the array plate, in combination with the chassis, provide a built-in self-support for the radar module.

13. The radar module of claim 12, wherein:
the chassis comprises a first channel configured to allow coolant flow of a fluid coolant therethrough;

the vertical stiffener comprises a second channel configured to allow coolant flow of the fluid coolant therethrough; and the first and second channels are in fluid communication.

14. The radar module of claim 13, wherein:

the array plate comprises a third channel configured to allow coolant flow of the fluid coolant therethrough; and the third channel is in fluid communication with at least one of the first and second channels.

15. The radar module of claim 13, wherein the first channel is in fluid communication with at least one of a coolant input port and a coolant output port integrated into the vertical stiffener.

16. The radar module of claim 12, wherein the integrated cooling manifold further comprises:

a supply manifold in fluid communication with a coolant input port; and a return manifold in fluid communication with a coolant output port.

17. The radar module of claim 12, wherein:

each of the first set of array electronics and the second set of array electronics comprises a respective plurality of radar transmit/receive (T/R) modules, each T/R module associated with power and beamforming signals; and the power and beamforming signals are connected in parallel to each of the first set of radiators and the second set of radiators.

18. An antenna array comprising:

a plurality of stacked radar modules, each respective radar module comprising:

a first set of array electronics in operable communication with a first set of radiators integrated into a first radiator assembly;

a second set of array electronics in operable communication with a second set of radiators integrated into a second radiator assembly;

a chassis configured to house the first set of array electronics and the second set of array electronics, wherein the first set of array electronics and the second set of array electronics are coupled to the chassis via a respective support structure contained within the chassis;

a vertical stiffener disposed within and operably coupled to the chassis so as to enable the chassis to be resistant to buckling, the vertical stiffener configured to be embedded within the first set of array electronics and the second set of array electronics and configured to define, in the chassis, a first cavity in which the first set of array electronics is disposed and a second cavity in which the second set of array electronics is disposed, wherein the vertical stiffener comprises an integrated cooling manifold configured to cool both the first set of array electronics and the second set of array electronics; and an array plate having a first side and a second side opposite the first side, the array plate coupled to the vertical stiffener and configured to support the first radiator assembly and the second radiator assembly, wherein the array plate is configured to enable the first radiator assembly and the second radiator assembly to be interlocked and aligned to create a single monolithic array face for the respective radar module such that the vertical stiffener and the array plate, in combination with the chassis, provide a built-in self-support for the respective radar module.

19. The antenna array of claim 18, wherein the chassis, the vertical stiffener, and the array plate of each respective radar module are configured to enable a respective monolithic array face for each respective radar module to align with the respective monolithic array faces for every other respective radar module in order to create a single monolithic array face for the antenna array that has no interruptions in an array lattice for the single monolithic array face for the antenna array.

20. The antenna array of claim 19, wherein elements of the first and second radiator assemblies have a common ground potential.

* * * * *